US012661888B2

(12) United States Patent
Yamaguchi

(10) Patent No.: US 12,661,888 B2
(45) Date of Patent: Jun. 23, 2026

(54) LIQUID EJECTING HEAD AND LIQUID EJECTING APPARATUS

(71) Applicant: SEIKO EPSON CORPORATION, Tokyo (JP)

(72) Inventor: Kei Yamaguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 18/666,197

(22) Filed: May 16, 2024

(65) Prior Publication Data

US 2024/0383249 A1 Nov. 21, 2024

(30) Foreign Application Priority Data

May 18, 2023 (JP) ................................ 2023-082095

(51) Int. Cl.
*B41J 2/14* (2006.01)

(52) U.S. Cl.
CPC ....... *B41J 2/14233* (2013.01); *B41J 2/14201* (2013.01); *B41J 2/1433* (2013.01); *B41J 2002/14306* (2013.01); *B41J 2002/14362* (2013.01); *B41J 2202/19* (2013.01)

(58) Field of Classification Search
CPC .. B41J 2/14233; B41J 2/14201; B41J 2/1433; B41J 2002/14306; B41J 2002/14362
See application file for complete search history.

(56) References Cited

FOREIGN PATENT DOCUMENTS

| | | | | |
|---|---|---|---|---|
| JP | 2017121760 A | * 7/2017 | ............... | B41J 2/01 |
| JP | 2021-000788 A | 1/2021 | | |

* cited by examiner

*Primary Examiner* — Geoffrey S Mruk
(74) *Attorney, Agent, or Firm* — WORKMAN NYDEGGER

(57) ABSTRACT

A liquid ejecting head includes a first substrate, a nozzle plate that is laminated on the first substrate and includes nozzles configured to eject a liquid in a first direction, a second substrate that is laminated on the first substrate at a position different from the nozzle plate, a fixing plate that is laminated on the second substrate to cover the second substrate when viewed in a second direction opposite to the first direction and includes an opening portion through which the nozzle plate is exposed to an outside, and a mold that closes a gap between the nozzle plate and the fixing plate, and the opening portion has a peripheral edge that is disposed between the second substrate and the nozzle plate when viewed in the second direction.

17 Claims, 12 Drawing Sheets

LIQUID EJECTING HEAD AND LIQUID EJECTING APPARATUS

The present application is based on, and claims priority from JP Application Serial Number 2023-082095, filed May 18, 2023, the disclosure of which is hereby incorporated by reference herein in its entirety.

BACKGROUND

1. Technical Field

The present disclosure relates to a liquid ejecting head and a liquid ejecting apparatus.

2. Related Art

In general, a liquid ejecting apparatus represented by an ink jet printer includes a liquid ejecting head that ejects a liquid such as ink. A liquid ejecting head described in JP-A-2017-121760 includes a piezoelectric element that causes pressure fluctuations in a liquid in a pressure chamber, and when the piezoelectric element is driven, the liquid is discharged from a nozzle provided in a nozzle substrate. In addition, the liquid ejecting head described in JP-A-2017-121760 is provided with a fixing plate that surrounds the nozzle substrate and has an opening through which the nozzle substrate is exposed. In addition, a region between an edge of the opening of the fixing plate and the nozzle substrate is filled with a mold composed of an adhesive, a filler, or the like.

In a liquid ejecting head, when a liquid such as ink is ejected from a nozzle, foggy mist may be generated. In the liquid ejecting head described in JP-A-2017-121760, since the mold is exposed inside the opening of the fixing plate, the generated mist is attached to the mold, and when a component contained in the liquid penetrates the mold, a crack may be generated in the mold with deformation of the mold. In addition, in the liquid ejecting head described in JP-A-2017-121760, when a crack is generated in the mold, the liquid enters from the crack, and the liquid ejecting head may be thus deteriorated.

SUMMARY

In order to solve the above-described problem, a liquid ejecting head according to a preferred aspect of the present disclosure includes a first substrate, a nozzle plate that is laminated on the first substrate and includes a plurality of nozzles that ejects a liquid in a first direction, a second substrate that is laminated on the first substrate at a position different from the nozzle plate, a fixing plate that is laminated on the second substrate to cover the second substrate when viewed in a second direction opposite to the first direction and includes an opening portion through which the nozzle plate is exposed to an outside, and a mold that closes a gap between the nozzle plate and the fixing plate, and the opening portion has a peripheral edge that is disposed between the second substrate and the nozzle plate when viewed in the second direction.

A liquid ejecting apparatus according to a preferred aspect of the present disclosure includes the liquid ejecting head according to the above-described aspect, and a liquid storage portion that stores a liquid to be supplied to the liquid ejecting head.

DESCRIPTION OF EMBODIMENTS

Figure 1:
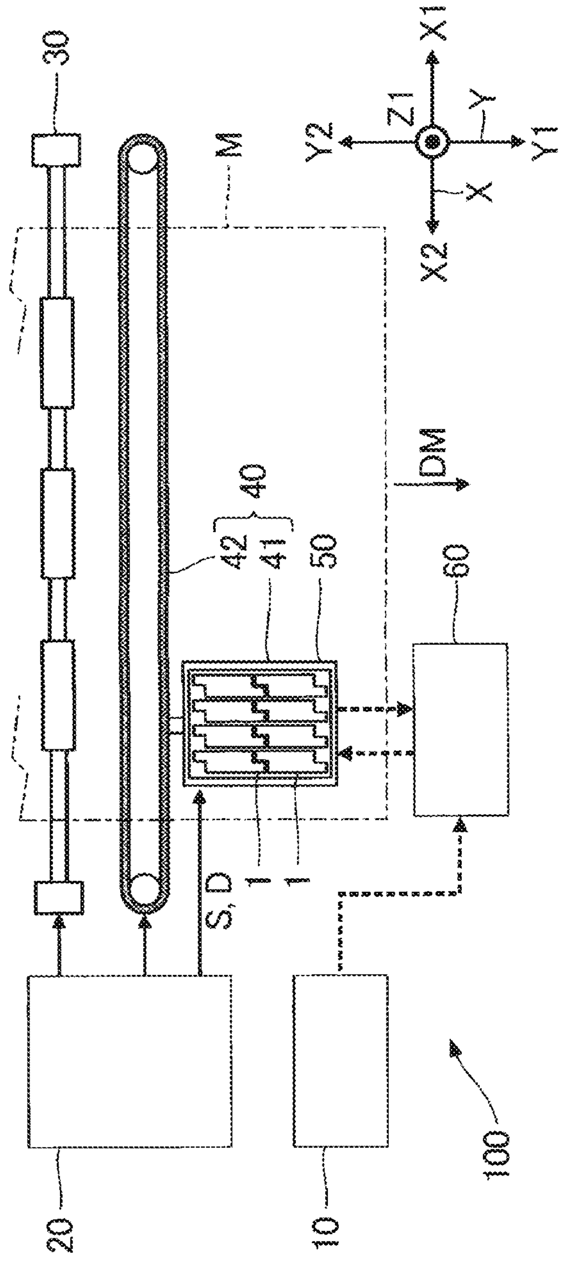
FIG. 1 is a schematic diagram illustrating a configuration example of a liquid ejecting apparatus according to a first embodiment.

Hereinafter, preferred embodiments according to the present disclosure will be described with reference to the accompanying drawings. Note that the dimensions and scales of the respective portions shown in the drawings appropriately differ from the actual dimensions and scales, and in order to facilitate understanding of the present disclosure, some portions are schematically illustrated. In addition, the scope of the present disclosure is not limited by the preferred embodiments unless such limitation is specifically stated below.

Note that in the following description, for convenience, an X-axis, a Y-axis, and a Z-axis intersecting each other are appropriately used. In addition, in the following description, one direction extending along the X-axis is an X1 direction, and an opposite direction of the X1 direction is an X2 direction. Similarly, opposite directions extending along the Y-axis is a Y1 direction and a Y2 direction. In addition, opposite directions extending along the Z-axis are a Z1 direction and a Z2 direction. The Z2 direction is an example of a "first direction", and the Z1 direction is an example of a "second direction".

Here, typically, the Z-axis is a vertical axis, and the Z2 direction corresponds to a down direction in the vertical direction. However, the Z-axis does not have to be a vertical axis. Moreover, typically, the X-axis, the Y-axis, and the Z-axis are orthogonal to each other, but are not limited thereto, and for example, may intersect each other at an angle within a range of equal to or more than 80° and equal to or less than 100°.

1. FIRST EMBODIMENT

1-1. Schematic Configuration of Liquid Ejecting Apparatus

FIG. 1 is a schematic diagram illustrating a configuration example of a liquid ejecting apparatus 100 according to a first embodiment. The liquid ejecting apparatus 100 is an ink jet printing apparatus that ejects ink, which is an example of a "liquid" as liquid droplets to a medium M. The medium M is typically printing paper. Note that the medium M is not limited to printing paper and may be a printing target made of any material such as a resin film or cloth, for example.

As illustrated in FIG. 1, the liquid ejecting apparatus 100 includes a liquid container 10, which is an example of a "liquid storage portion", a control unit 20, a transport mechanism 30, a moving mechanism 40, a head module 50, and a circulation mechanism 60. Hereinafter, based on FIG. 1, the above-described components will be briefly described in sequence.

The liquid container 10 stores ink. Examples of a specific aspect of the liquid container 10 include a cartridge that can be attached to or detached from the liquid ejecting apparatus 100, a bag-shaped ink pack formed of a flexible film, an ink tank that can be refilled with ink, and the like. The type of ink stored in the liquid container 10 is not particularly limited, and any type of ink can be stored.

The control unit 20 includes a processing circuit such as a central processing unit (CPU) or a field programmable gate array (FPGA) and a memory circuit such as a semiconductor memory and controls operation of each element of the liquid ejecting apparatus 100.

The transport mechanism 30 transports the medium M in a transport direction DM, which is the Y1 direction, under the control of the control unit 20. The moving mechanism 40 reciprocates the head module 50 in the X1 direction and the X2 direction under the control of the control unit 20. In the example of FIG. 1, the moving mechanism 40 includes a substantially box-shaped transport body 41 that accommodates the head module 50 and is referred to as a carriage, and a transport belt 42 to which the transport body 41 is fixed. Note that in addition to the head module 50, the above-described liquid container 10 may be mounted on the transport body 41.

The head module 50 ejects ink, supplied via the circulation mechanism 60 from the liquid container 10, from each of a plurality of nozzles to the medium M in the Z2 direction under the control of the control unit 20. When the ejection is performed concurrently with transporting of the medium M by using the transport mechanism 30 and reciprocating of the head module 50 by using the moving mechanism 40, an image is formed by ink on a surface of the medium M. The head module 50 includes a plurality of liquid ejecting heads 1. Details of each liquid ejecting head 1 will be described based on FIGS. 2 to 8 later.

In the example of FIG. 1, the liquid container 10 is coupled to the head module 50 via the circulation mechanism 60. The circulation mechanism 60 is a mechanism that supplies ink to the head module 50 and also collects ink discharged from the head module 50 so as to supply the ink to the head module 50 again. Through the operation of the circulation mechanism 60, an increase in viscosity of ink can be suppressed, and accumulation of bubbles in ink can be reduced. Note that the liquid container 10 is an example of a "liquid storage portion", but a sub-tank (not illustrated) of the circulation mechanism 60 may be considered to be the "liquid storage portion". In addition, the circulation mechanism 60 is provided where necessary and may be omitted. That is, the liquid ejecting apparatus 100 does not have to have a configuration in which ink in each liquid ejecting head 1 is circulated.

As described above, the liquid ejecting apparatus 100 includes the liquid ejecting head 1 and the liquid container 10, which is an example of the "liquid storage portion". As described above, the liquid container 10 stores ink to be supplied to the liquid ejecting head 1. In the liquid ejecting apparatus 100 described above, entry of a liquid from a cracked portion of a mold 18*f* of the liquid ejecting head 1 is prevented as described later, and the reliability of the liquid ejecting apparatus 100 can be thus improved.

1-2. Liquid Ejecting Head

Figure 2:
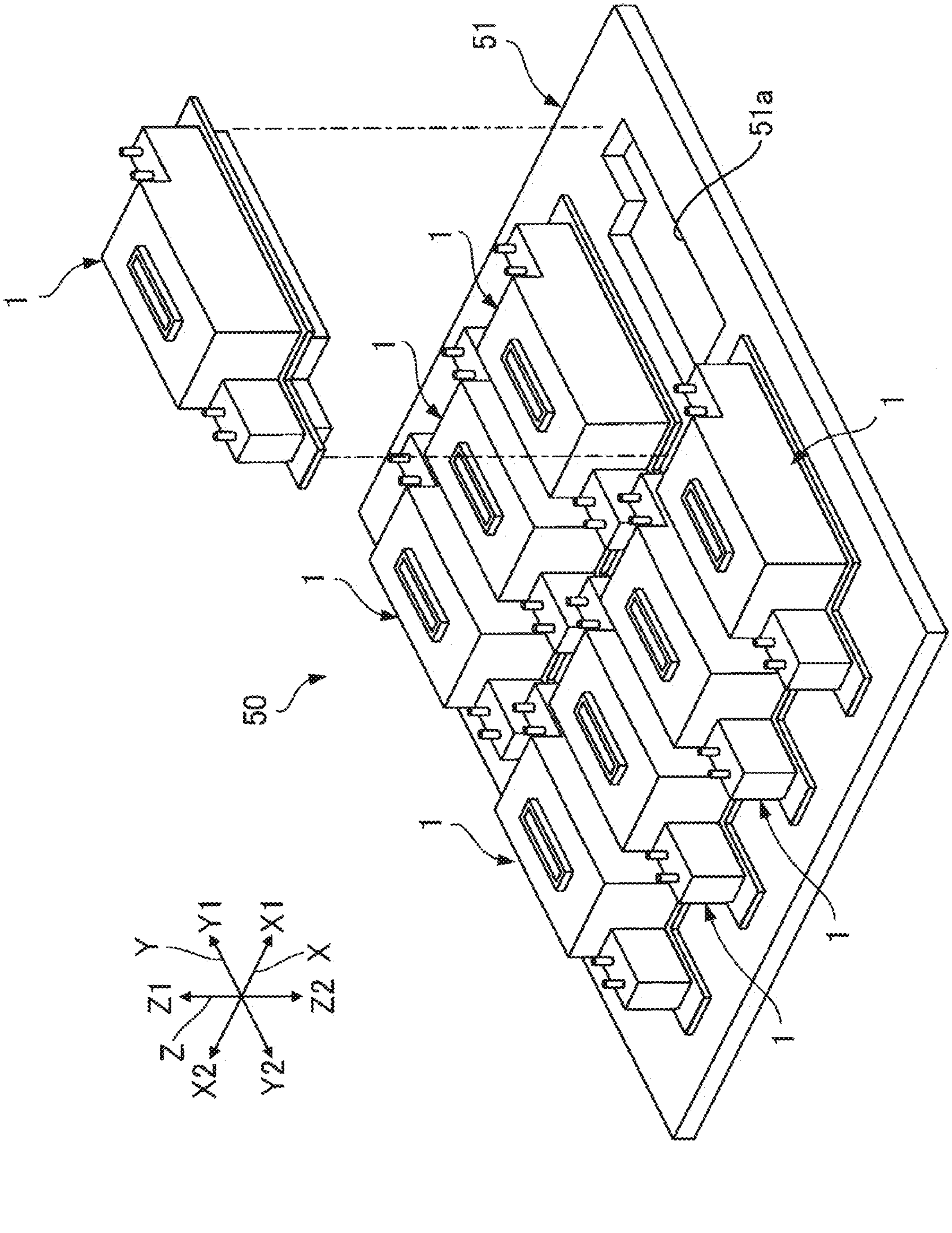
FIG. 2 is a perspective view of a head module including a liquid ejecting head according to the first embodiment.

FIG. 2 is a perspective view of the head module 50 including the liquid ejecting head 1 according to the first embodiment. As illustrated in FIG. 2, the head module 50 includes a supporting body 51 and the plurality of liquid ejecting heads 1.

The supporting body 51 is a plate-like member that supports the plurality of liquid ejecting heads 1. The supporting body 51 is provided with a plurality of attaching holes 51*a*. Each liquid ejecting head 1 is fixed to the supporting body 51 in a state of being inserted into a corresponding one of the attaching holes 51*a* through screwing with a screw, or the like. The plurality of liquid ejecting heads 1 is arranged in a matrix along the X-axis and the Y-axis.

Note that the number and the arrangement of the liquid ejecting heads 1 included in the head module 50 are not limited to the example of FIG. 2, and any number or arrangement may be adopted. In addition, the shape of the supporting body 51 is also not limited to the example of FIG. 2, and any shape may be adopted.

Figure 3:
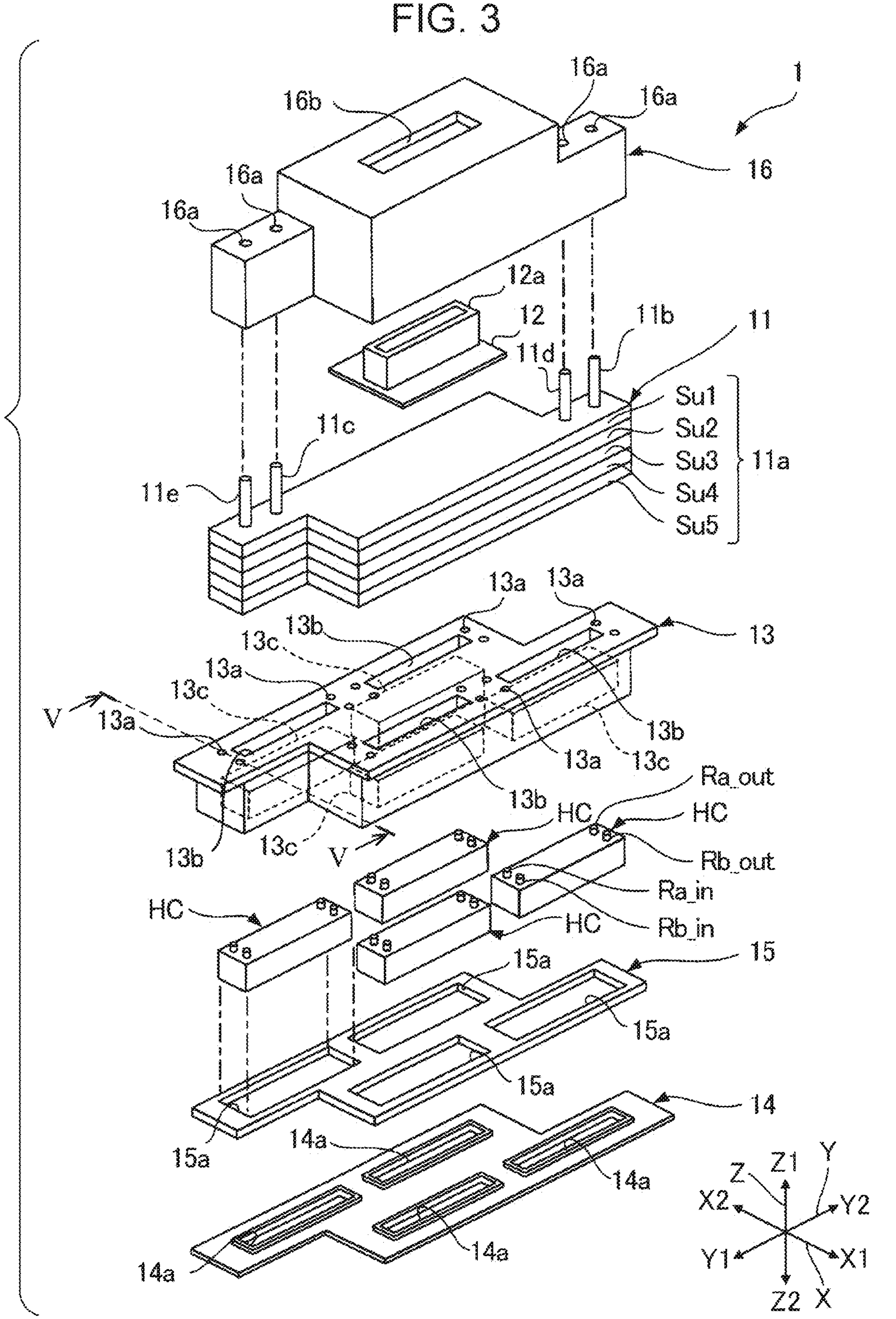
FIG. 3 is an exploded perspective view of the liquid ejecting head.

FIG. 3 is an exploded perspective view of the liquid ejecting head 1. As illustrated in FIG. 3, the liquid ejecting head 1 includes a channel structure 11, a wiring substrate 12, a holder 13, four head chips HC, a fixing plate 14, a reinforcing plate 15, and a cover 16. The above-described components are arranged in the Z2 direction in the following order: the cover 16, the wiring substrate 12, the channel structure 11, the holder 13, the four head chips HC, the reinforcing plate 15, and the fixing plate 14. Hereinafter, an outline of each portion of the liquid ejecting head 1 will be described in sequence based on FIG. 3.

The channel structure 11 is a structure in which channels for supplying ink from the circulation mechanism 60 to the four head chips HC are provided. The channel structure 11 includes a channel member 11*a* and four coupling pipes 11*b*, 11*c*, 11*d*, and 11*e*.

Although not illustrated in FIG. 3, the channel member 11*a* is provided with a supply channel for supplying ink to the four head chips HC, and a discharge channel for discharging ink from the four head chips HC.

The channel member 11*a* includes a plurality of substrates Su1 to Su5, and these substrates are laminated in the Z2 direction in this order. Each of the substrates Su1 to Su5 is made of, for example, a resin material such as Zylon, polyphenylene sulfide (PPS), polypropylene (PP), or the like and formed through injection molding. "Zylon" is a registered trademark. In addition, the plurality of substrates Su1 to Su5 is bonded to each other by, for example, an adhesive such as an epoxy-based adhesive. Note that the number, the thickness, or the like of substrates constituting the channel member 11*a* is not limited to the example of FIG. 3, and any number, thickness, or the like may be adopted.

Each of the coupling pipes 11*b*, 11*c*, 11*d*, and 11*e* is a pipe body that projects from a surface of the channel member 11*a* facing in the Z1 direction. Each of the coupling pipes 11*b* and 11*c* is coupled to the above-described supply channel. Each of the coupling pipes 11*d* and 11*e* is coupled to the above-described discharge channel.

The wiring substrate 12 is a mounting component for electrically coupling the liquid ejecting head 1 to the control unit 20. The wiring substrate 12 is composed of, for example, a flexible wiring substrate, a rigid wiring substrate, or the like. The wiring substrate 12 is disposed on the channel structure 11, and a surface of the wiring substrate 12 facing in the Z2 direction faces the channel structure 11. On the other hand, a coupler 12*a* is installed on a surface of the wiring substrate 12 facing in the Z1 direction. The coupler 12*a* is a coupling component for electrically coupling the liquid ejecting head 1 to the control unit 20. In addition, although not illustrated, wiring coupled to the four head chips HC is coupled to the wiring substrate 12. The wiring is composed of, for example, a combination of a flexible wiring substrate and a rigid wiring substrate. Note that the wiring may be integrally configured with the wiring substrate 12.

The holder 13 is a structure that accommodates and supports the four head chips HC. The holder 13 is made of, for example, a resin material, a metal material, or the like. The holder 13 is provided with a plurality of holder channels 13*a*, a plurality of wiring holes 13*b*, and a plurality of recessed portions 13*c*. Each of the plurality of holder channels 13*a* is a hole through which ink flows between a corresponding one of the head chips HC and the channel structure 11. Each holder channel 13*a* is provided so as to correspond to inlets Ra_in and Rb_in and outlets Ra_out and Rb_out described later. Each of the plurality of wiring holes 13*b* is a hole through which wiring (not illustrated) that couples a corresponding one of the head chips HC to the wiring substrate 12 passes. Each of the plurality of recessed portions 13*c* opens in the Z2 direction and is a space in which a corresponding one of the head chips HC is disposed.

Each head chip HC ejects ink. Each head chip HC is provided with the inlets Ra_in and Rb_in, and the outlets Ra_out and Rb_out. Each of the inlets Ra_in and Rb_in is an opening for introducing ink. Each of the outlets Ra_out and Rb_out is an opening for discharging ink. Each of the inlets Ra_in and Rb_in, and the outlets Ra_out and Rb_out is bonded to the head chip HC and the holder 13 by an adhesive and is thus coupled to a corresponding one of the holder channels 13*a* in a liquid tight manner. The configuration of the head chip HC will be described in detail based on FIGS. 4 and 5 described later.

The fixing plate 14 is a plate member for fixing the four head chips HC to the holder 13. Specifically, the fixing plate 14 is disposed with the four head chips HC interposed between the fixing plate 14 and the holder 13 and is fixed to the holder 13 by an adhesive. The fixing plate 14 is made of, for example, a metal material, or the like. The fixing plate 14 has a plurality of opening portions 14*a* through which a nozzle plate 18*c*, described later, of the respective four head chips HC is exposed. In the example of FIG. 3, each of the plurality of opening portions 14*a* is provided for each head chip HC. In FIG. 3, the fixing plate 14 is schematically illustrated, and the mold 18*f* described later is not illustrated, but details of the fixing plate 14 and the mold 18*f* will be described later based on FIGS. 7 and 8.

The reinforcing plate 15 is a plate-like member that is disposed between the holder 13 and the fixing plate 14 and reinforces the fixing plate 14. The reinforcing plate 15 is overlapped onto the fixing plate 14 and fixed to the fixing plate 14 by an adhesive. The reinforcing plate 15 is provided with a plurality of opening portions 15*a* in which the four head chips HC are disposed. The reinforcing plate 15 is made of, for example, a metal material, or the like. Note that the reinforcing plate 15 is provided where necessary and may be omitted.

The cover 16 is a box-shaped member that accommodates the channel member 11*a* of the channel structure 11 and the wiring substrate 12. The cover 16 is made of, for example, a resin material, or the like. The cover 16 is provided with four through-holes 16*a* and an opening portion 16*b*. The four through-holes 16*a* correspond to the coupling pipes 11*b*, 11*c*, 11*d*, and 11*e* of the channel structure 11, and a corresponding one of the coupling pipes 11*b*, 11*c*, 11*d*, and 11*e* is inserted into each through-hole 16*a*. The coupler 12*a* is inserted into the opening portion 16*b* from the inside of the cover 16 to the outside.

1-3. Head Chip

Figure 4:
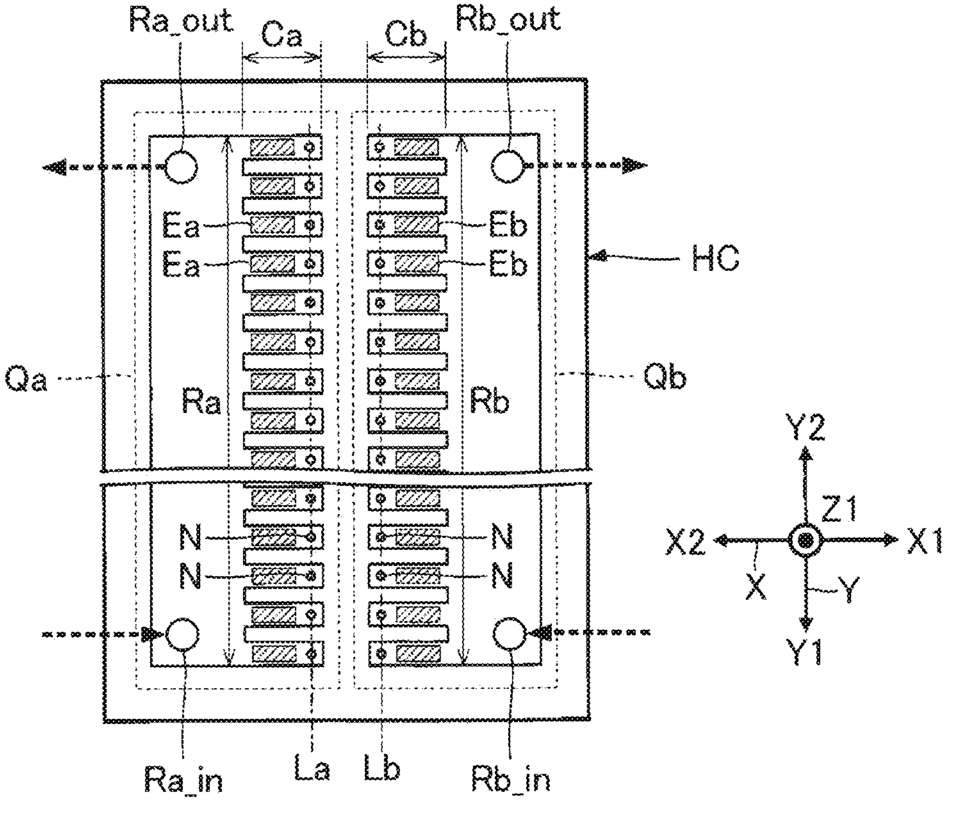
FIG. 4 is a schematic diagram illustrating a configuration example of a head chip.

FIG. 4 is a schematic diagram illustrating a configuration example of the head chip HC. In FIG. 4, an internal structure of the head chip HC when viewed in the Z2 direction is schematically described. As illustrated in FIG. 4, the head chip HC is provided with a plurality of nozzles N that ejects ink. The plurality of nozzles N is divided into a nozzle row La and a nozzle row Lb. Each of the nozzle row La and the nozzle row Lb is a collection of the plurality of nozzles N that is arranged along the Y-axis. The nozzle row La and the nozzle row Lb are arranged at an interval in between in the X-axis direction.

The head chip HC includes a liquid ejecting unit Qa including the nozzle row La and a liquid ejecting unit Qb including the nozzle row Lb.

The liquid ejecting unit Qa includes a liquid storage chamber Ra, a plurality of pressure chambers Ca, and a plurality of driving elements Ea. The liquid storage chamber Ra is a common liquid chamber continuous over the plurality of nozzles N of the nozzle row La. Each of the pressure chambers Ca and the driving elements Ea is provided for each nozzle N of the nozzle row La. The pressure chamber Ca is a space in communication with the nozzle N. Each of the plurality of pressure chambers Ca is filled with ink supplied from the liquid storage chamber Ra. The driving element Ea causes pressure fluctuations in the ink in the pressure chamber Ca. The driving element Ea is, for example, a piezoelectric element that changes the volume of the pressure chamber Ca by deforming a wall surface of the pressure chamber Ca, or a heating element that generates bubbles in the pressure chamber Ca by heating the ink in the pressure chamber Ca. When the driving element Ea causes pressure fluctuations in the ink in the pressure chamber Ca, the ink in the pressure chamber Ca is ejected from the nozzle N.

Note that in the specification, “in communication with” includes an aspect in which one space is formed through directly coupling of two target spaces, and an aspect in which one space is formed through coupling of two target spaces with another space interposed therebetween.

Similarly to the liquid ejecting unit Qa, the liquid ejecting unit Qb includes a liquid storage chamber Rb, a plurality of pressure chambers Cb, and a plurality of driving elements Eb. The liquid storage chamber Rb is a common liquid chamber continuous over the plurality of nozzles N of the nozzle row Lb. Each of the pressure chambers Cb and the driving elements Eb is provided for each nozzle N of the nozzle row Lb. Each of the plurality of pressure chambers Cb is filled with ink supplied from the liquid storage chamber Rb. The driving element Eb is, for example, the above-described piezoelectric element or heating element.

When the driving element Eb causes pressure fluctuations in the ink in the pressure chamber Cb, the ink in the pressure chamber Cb is ejected from the nozzle N.

As illustrated in FIG. 4, the head chip HC is provided with the inlet Ra_in and the outlet Ra_out, and the inlet Rb_in and the outlet Rb_out. Each of the inlet Ra_in and the outlet Ra_out is in communication with the liquid storage chamber Ra. Each of the inlet Rb_in and the outlet Rb_out is in communication with the liquid storage chamber Rb.

In the above-described head chip HC, the ink introduced to the liquid storage chamber Ra from the inlet Ra_in is appropriately used for ejection from each nozzle N of the nozzle row La. In addition, the ink that is not ejected from each nozzle N of the nozzle row La and is stored in the liquid storage chamber Ra is discharged from the outlet Ra_out. Similarly, the ink introduced to the liquid storage chamber Rb from the inlet Rb_in is appropriately used for ejection from each nozzle N of the nozzle row Lb. In addition, the ink that is not ejected from each nozzle N of the nozzle row Lb and is stored in the liquid storage chamber Rb is discharged from the outlet Rb_out.

Figure 5:
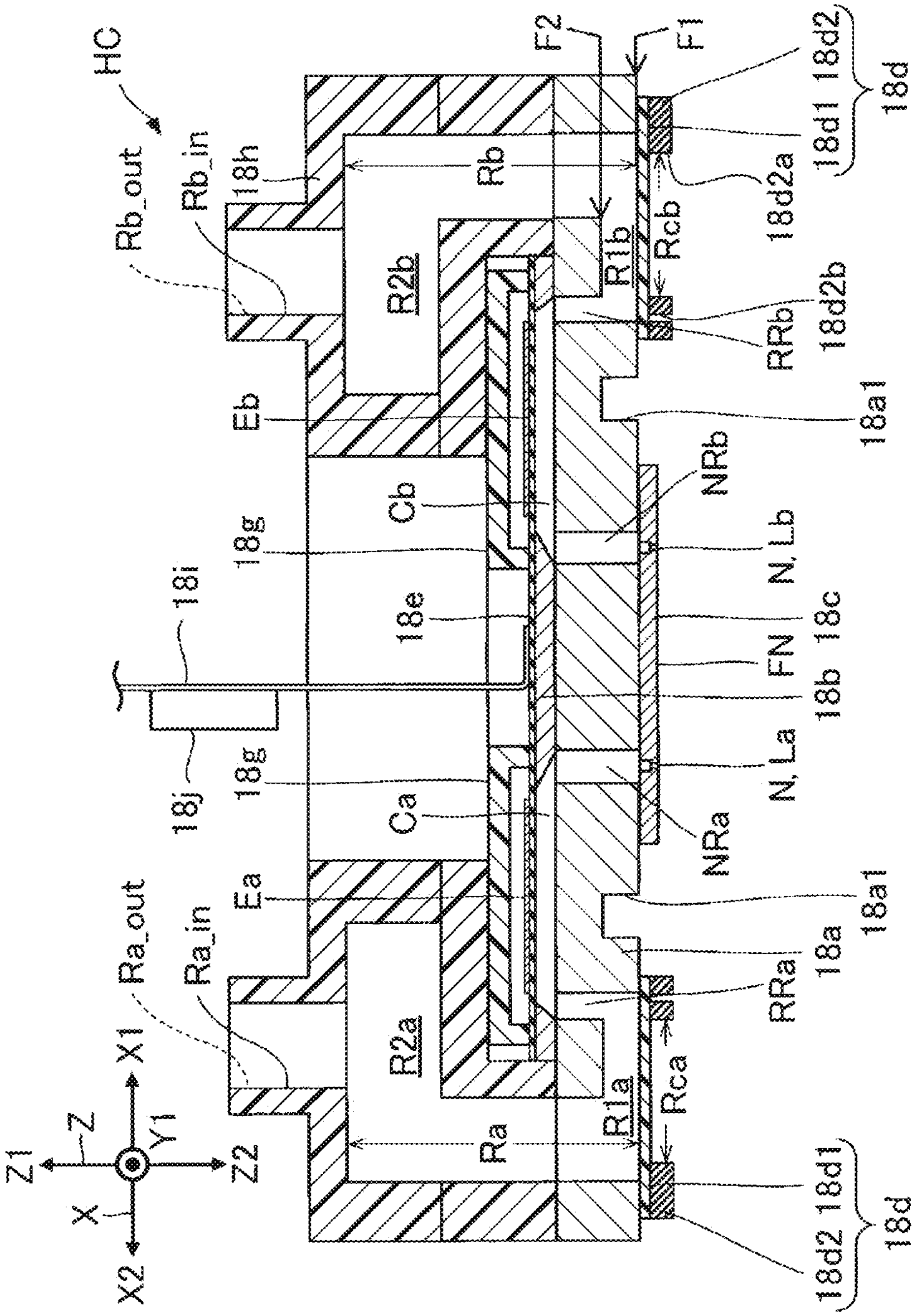
FIG. 5 is a sectional view illustrating a configuration example of the head chip.

FIG. 5 is a sectional view illustrating a configuration example of the head chip HC. As illustrated in FIG. 5, the head chip HC includes a communication plate 18*a*, a pressure chamber substrate 18*b*, the nozzle plate 18*c*, a compliance substrate 18*d*, a vibrating plate 18*e*, the pluralities of driving elements Ea and Eb, a cover 18*g*, a case 18*h*, a wiring substrate 18*i*, and a drive circuit 18*j*. Here, the communication plate 18*a* is an example of a "first substrate", and the compliance substrate 18*d* is an example of a "second substrate".

The communication plate 18*a* and the pressure chamber substrate 18*b* are laminated in the Z1 direction in this order and form a channel for supplying ink to the plurality of nozzles N. In a region located further in the Z1 direction than is a laminated body formed of the communication plate 18*a* and the pressure chamber substrate 18*b*, the vibrating plate 18*e*, the pluralities of driving elements Ea and Eb, the cover 18*g*, the case 18*h*, the wiring substrate 18*i*, and the drive circuit 18*j* are installed. On the other hand, in a region located further in the Z2 direction than is the laminated body, the nozzle plate 18*c* and the compliance substrate 18*d* are installed. Each element of the head chip HC is schematically a plate-like member elongated in the Y direction and is bonded to each other by, for example, an adhesive, direct bonding, or the like. Hereinafter, each element of the head chip HC will be described in sequence based on FIG. 5.

The nozzle plate 18*c* is a plate-like member that is laminated on the communication plate 18*a* and includes the plurality of nozzles N of each of the nozzle row La and the nozzle row Lb. Each of the plurality of nozzles N is a through-hole through which ink passes and ejects the ink in the Z2 direction. Here, a surface of the nozzle plate 18*c* facing in the Z2 direction constitutes a nozzle surface FN. The nozzle plate 18*c* is manufactured through, for example, processing of a single-crystal silicon substrate by a semiconductor manufacturing technique using a processing technique such as dry etching or wet etching. However, other known methods and materials may be appropriately used for manufacturing the nozzle plate 18*c*. In addition, a sectional shape of a nozzle is typically a circular shape, but is not limited thereto, and may be a non-circular shape such as a polygon or an ellipse.

The communication plate 18*a* is provided with a plurality of spaces R1*a* and R1*b*, a plurality of supply channels RRa and RRb, and a plurality of communication channels NRa and NRb as channels in communication with the nozzles N of the nozzle row La and the nozzle row Lb. Each of the spaces R1*a* and R1*b* is an elongated opening extending in a direction along the Y-axis in plan view in a direction along the Z-axis. Each of the supply channels RRa and RRb, and the communication channels NRa and NRb is a through-hole formed for each nozzle N. Each supply channel RRa is in communication with the space R1*a*. Each supply channel RRb is in communication with the space R1*b*.

Figure 7:
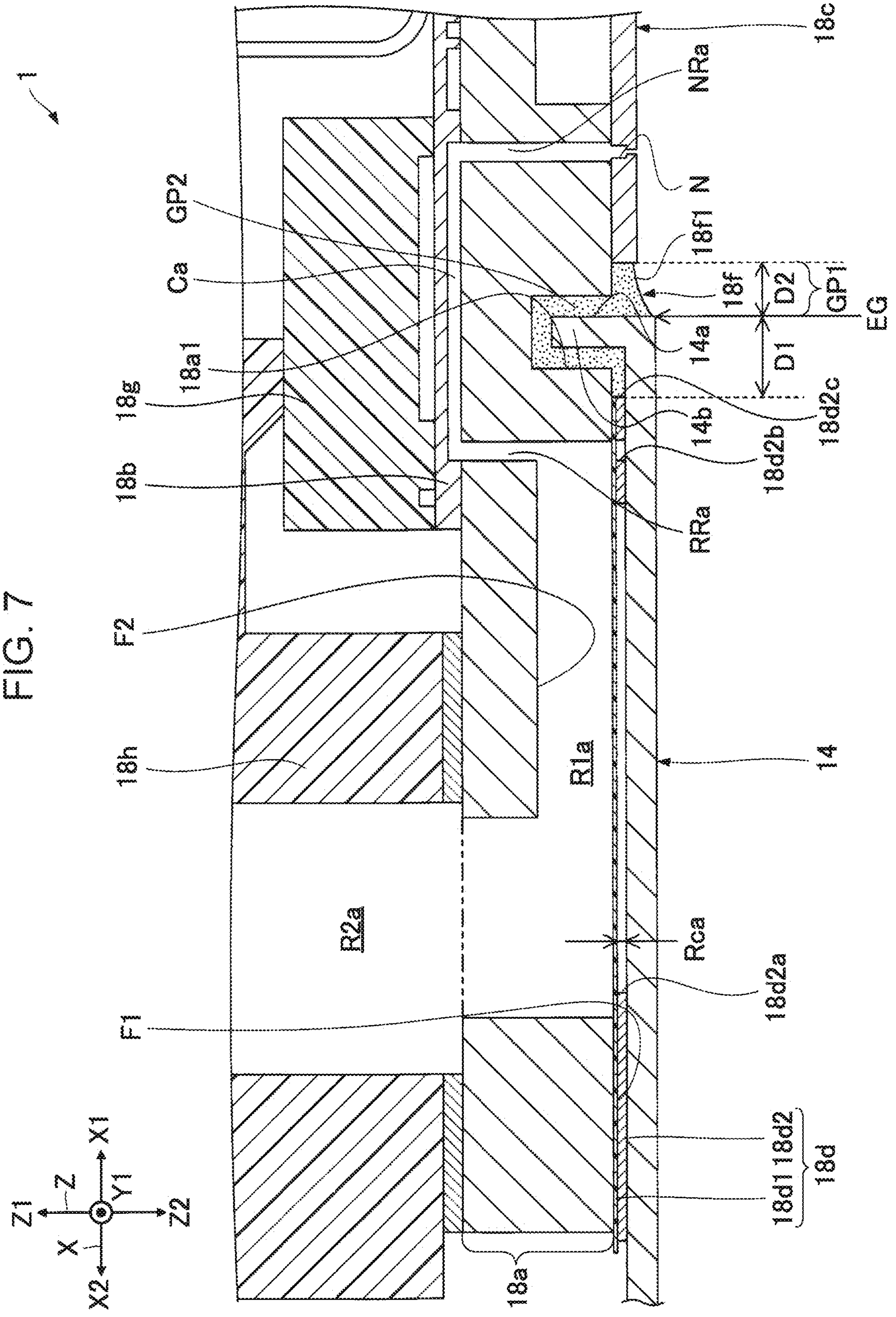
FIG. 7 is a sectional view of the liquid ejecting head according to the first embodiment.

The communication plate 18*a* includes a pair of plate surfaces, and the nozzle plate 18*c* and the compliance substrate 18*d* are laminated on a first surface F1, which is a plate surface, of the pair of plate surfaces, facing in the Z2 direction. In addition, in the first surface F1, the above-described spaces R1*a* and R1*b* and communication channels NRa and NRb open, and a recessed portion 18*a*1 that is recessed in the Z1 direction is also formed. The recessed portion 18*a*1 is a recess that fits to a projecting portion 14*b* of the fixing plate 14, which is illustrated in FIG. 7 and described later, at an interval. In addition, the communication plate 18*a* includes a second surface F2 that is formed by half etching when the spaces R1*a* and R1*b* are formed. The second surface F2 is a surface defining the spaces R1*a* and R1*b* and facing in the Z2 direction.

Here, a bottom surface of the recessed portion 18*a*1 and the second surface F2 of the communication plate 18*a* are disposed at substantially the same position in the Z2 direction. Therefore, the recessed portion 18*a*1 can be formed in the same single process as half etching for forming a channel in the communication plate 18*a*. Therefore, the communication plate 18*a* can be easily manufactured, compared to an aspect in which the bottom surface of the recessed portion 18*a*1 and the second surface F2 of the communication plate 18*a* are disposed at deviated positions in the Z2 direction. Here, "substantially the same position" means that a depth of the second surface F2 is within 10% with respect to a depth of the recessed portion 18*a*1.

Note that the bottom surface of the recessed portion 18*a*1 and the second surface F2 of the communication plate 18*a* may be disposed at deviated positions in the Z2 direction. However, in this case, for example, the recessed portion 18*a*1 is formed by half etching of a process different from the half etching for forming a channel in the communication plate 18*a*, or the recessed portion 18*a*1 is formed in the same signal process of the half etching for forming a channel in the communication plate 18*a* using a gray scale mask.

The pressure chamber substrate 18*b* is a plate-like member provided with the plurality of pressure chambers Ca and the plurality of pressure chambers Cb. The plurality of pressure chambers Ca is arranged in a direction along the Y-axis. Similarly, the plurality of pressure chambers Cb is arranged in a direction along the Y-axis. Each pressure chamber Ca is an elongated space that is formed for each nozzle N of the nozzle row La and extends in a direction along the X-axis in plan view. Similarly, each pressure chamber Cb is an elongated space that is formed for each nozzle N of the nozzle row Lb and extends in a direction along the X-axis in plan view. Similarly to the above-described nozzle plate 18*c*, each of the communication plate 18*a* and the pressure chamber substrate 18*b* is manufactured through, for example, processing of a single-crystal silicon substrate by a semiconductor manufacturing technique. However, other known methods and materials may be appropriately used for manufacturing each of the communication plate 18*a* and the pressure chamber substrate 18*b*.

The pressure chamber Ca is in communication with each of the communication channel NRa and the supply channel RRa. Therefore, the pressure chamber Ca is in communication with the nozzle N of the nozzle row La through the communication channel NRa and is also in communication with the space R1*a* through the supply channel RRa. Similarly, the pressure chamber Cb is in communication with each of the communication channel NRb and the supply channel RRb. Therefore, the pressure chamber Cb is in communication with the nozzle N of the nozzle row Lb through the communication channel NRb and is also in communication with the space R1*b* through the supply channel RRb.

The vibrating plate 18*e* is disposed on a surface of the pressure chamber substrate 18*b* facing in the Z1 direction. The vibrating plate 18*e* is a plate-like member that can elastically vibrates. The vibrating plate 18*e* includes, for example, a first layer and a second layer, and the first layer and the second layer are laminated in the Z1 direction in this order. The first layer is, for example, an elastic film made of silicon oxide ($SiO_2$). The elastic film is formed through, for example, performing of thermal oxidation on one surface of a single-crystal silicon substrate. The second layer is, for example, an insulating film made of zirconium oxide ($ZrO_2$). The insulating film is formed through, for example, forming of a zirconium layer by a sputtering method and performing of thermal oxidation on the layer. Note that the vibrating plate 18*e* is not limited to having the above-described configuration obtained through laminating of the first layer and the second layer and may be composed of a single layer, or three or more layers, for example.

The plurality of driving elements Ea and the plurality of driving element Eb are disposed on a surface of the vibrating plate 18*e* facing in the Z1 direction. Each of the driving elements Ea and the driving elements Eb is a passive element that is deformed by supply of a driving signal. Each of the driving elements Ea and the driving elements Eb has an elongated shape extending in a direction along the X-axis in plan view. The plurality of driving elements Ea is arranged in a direction along the Y-axis so as to correspond to the plurality of pressure chambers Ca. The driving elements Ea overlap with the pressure chambers Ca in plan view. Similarly, the plurality of driving elements Eb is arranged in a direction along the Y-axis so as to correspond to the plurality of pressure chambers Cb. The driving elements Eb overlap with the pressure chambers Cb in plan view.

Although not illustrated, each of the driving elements Ea and Eb includes a first electrode, a piezoelectric layer, and a second electrode, and the first electrode, the piezoelectric layer, and the second electrode are laminated in the Z1 direction in this order. One electrode of the first electrode and the second electrode is an individual electrode that is disposed apart from another one for each driving element Ea or each driving element Eb, and a driving signal is applied to the one electrode. The other one of the first electrode and the second electrode is a strip-like common electrode extending in a direction along the Y-axis so as to be continuous over the plurality of driving elements Ea or the plurality of driving elements Eb, and a predetermined reference potential is supplied to the other electrode. Examples of the metal material for the above-described electrodes include a metal material such as, for example, platinum (Pt), aluminum (Al), nickel (Ni), gold (Au), or copper (Cu), and the above-described metal materials can be used as one kind alone or in combination of two or more kinds thereof in the form of an alloy, laminate, or the like. The piezoelectric layer is made of a piezoelectric material such as lead zirconate titanate ($Pb(Zr, Ti) O_3$), and for example, has a strip shape extending in a direction along the Y-axis so as to be continuous over the plurality of driving elements Ea or the plurality of driving elements Eb. However, the piezoelectric layer may be individually provided for each driving element Ea or each driving element Eb. When the vibrating plate 18*e* vibrates in conjunction with deformation of the above-described driving elements Ea described above, the pressure in the pressure chambers Ca fluctuates, as a result of which ink is ejected from the nozzles N of the nozzle row La. Similarly, when the vibrating plate 18*e* vibrates in conjunction with deformation of the driving elements Eb, the pressure in the pressure chambers Cb fluctuates, as a result of which ink is ejected from the nozzles N of the nozzle row Lb. Note that as the driving elements, heating elements that heat ink in the pressure chambers Ca and Cb may be used instead of the driving elements Ea and Eb.

The cover 18*g* is a plate-like member that is installed on a surface of the vibrating plate 18*e* facing in the Z1 direction, protects the plurality of driving elements Ea and the plurality of driving elements Eb, and also reinforces mechanical strength of the vibrating plate 18*e*. Here, the plurality of driving elements Ea and the plurality of driving elements Eb are accommodated between the cover 18*g* and the vibrating plate 18*e*. The cover 18*g* is made of, for example, a resin material.

The case 18*h* is a case for storing ink suppled to the plurality of pressure chambers Ca and the plurality of pressure chambers Cb. The case 18*h* is made of, for example, a resin material. The case 18*h* is provided with spaces R2*a* and R2*b*, the inlets Ra_in and Rb_in, and the outlets Ra_out and Rb_out. The space R2*a* is a space in communication with the above-described space R1*a* and functions, together with the space R1*a*, as the liquid storage chamber Ra, which is a reservoir that stores ink supplied to the plurality of pressure chambers Ca. The ink in the liquid storage chamber Ra is supplied to the pressure chambers Ca through each supply channel RRa. Similarly, the space R2*b* is a space in communication with the above-described space R1*b* and functions, together with the space R1*b*, as the liquid storage chamber Rb, which is a reservoir that stores ink supplied to the plurality of pressure chambers Cb. The ink in the liquid storage chamber Rb is supplied to the pressure chambers Cb through each supply channel RRb.

The compliance substrate 18*d* is a substrate that absorbs pressure fluctuations in the ink in the liquid storage chambers Ra and Rb. The compliance substrate 18*d* is laminated on the communication plate 18*a* at a position different from the nozzle plate 18*c*. That is, the compliance substrate 18*d* and the nozzle plate 18*c* are laminated so as not to overlap with each other on a surface of the communication plate 18*a* facing in the Z2 direction.

The compliance substrate 18*d* includes a compliance film 18*d*1 and a frame body 18*d*2. The compliance film 18*d*1 is a flexible resin film that constitutes wall surfaces of the liquid storage chambers Ra and Rb. A surface of the compliance film 18*d*1 facing in the Z1 direction is bonded to the communication plate 18*a* by an adhesive such as an epoxy-based adhesive. On the other hand, the frame body 18*d*2 is bonded to a surface of the compliance film 18*d*1 facing in the Z2 direction by an adhesive such as a urethane-based adhesive or an epoxy-based adhesive. The frame body 18*d*2 is a frame-shaped member for forming compliance spaces Rca and Rcb. The frame body 18*d*2 is made of, for example, a metal material such as stainless steel, aluminum, titanium, or a magnesium alloy. Note that the compliance substrate 18*d* may be a flexible thin plate made of metal.

Although not illustrated, a surface of the frame body 18*d*2 facing in the Z2 direction is bonded to the above-described fixing plate 14 by an adhesive such as an epoxy-based adhesive. Here, the compliance spaces Rca and Rcb defined by the frame body 18*d*2 are formed between the compliance film 18*d*1 and the fixing plate 14. The compliance space Rca is separated from the liquid storage chamber Ra by the compliance film 18*d*1 and is a space that allows deformation of the compliance film 18*d*1 according to the pressure change in the ink in the liquid storage chamber Ra. The compliance space Rcb is separated from the liquid storage chamber Rb by the compliance film 18*d*1 and is a space that allows deformation of the compliance film 18*d*1 according to the pressure change in the ink in the liquid storage chamber Rb.

In the example of FIG. 5, the frame body 18*d*2 includes a pair of openings 18*d*2*a* for forming the compliance spaces Rca and Rcb, and a pair of slits 18*d*2*b* that functions as an escape portion of an adhesive. Each of the pair of openings 18*d*2*a* is a hole that passes through the frame body 18*d*2 in a thickness direction, and has a shape extending in a direction along the Y-axis when viewed in a direction along the Z-axis. The pair of slits 18*d*2*b* is disposed between the pair of openings 18*d*2*a*, each of the pair of slits 18*d*2*b* is a hole passing through the frame body 18*d*2 in a thickness direction and has a shape extending in a direction along the Y-axis when viewed in a direction along the Z-axis. Note that the slit 18*d*2*b* that functions as an escape portion of an adhesive is provided where necessary and may be omitted.

The wiring substrate 18*i* is mounted on a surface of the vibrating plate 18*e* facing in the Z1 direction, and is a mounting component for electrically coupling the control unit 20 to the head chip HC. The wiring substrate 18*i* is a flexible wiring substrate such as a chip on film (COF), a flexible printed circuit (FPC), or a flexible flat cable (FFC), for example. The drive circuit 18*j* for supplying a driving voltage to each of the driving elements Ea and Eb is mounted on the wiring substrate 18*i* of the present embodiment. The drive circuit 18*j* is a circuit that switches whether or not to supply at least a part of waveforms included in a driving signal D as a driving pulse, based on a control signal S.

1-4. Fixing Plate and Mold

Figure 6:
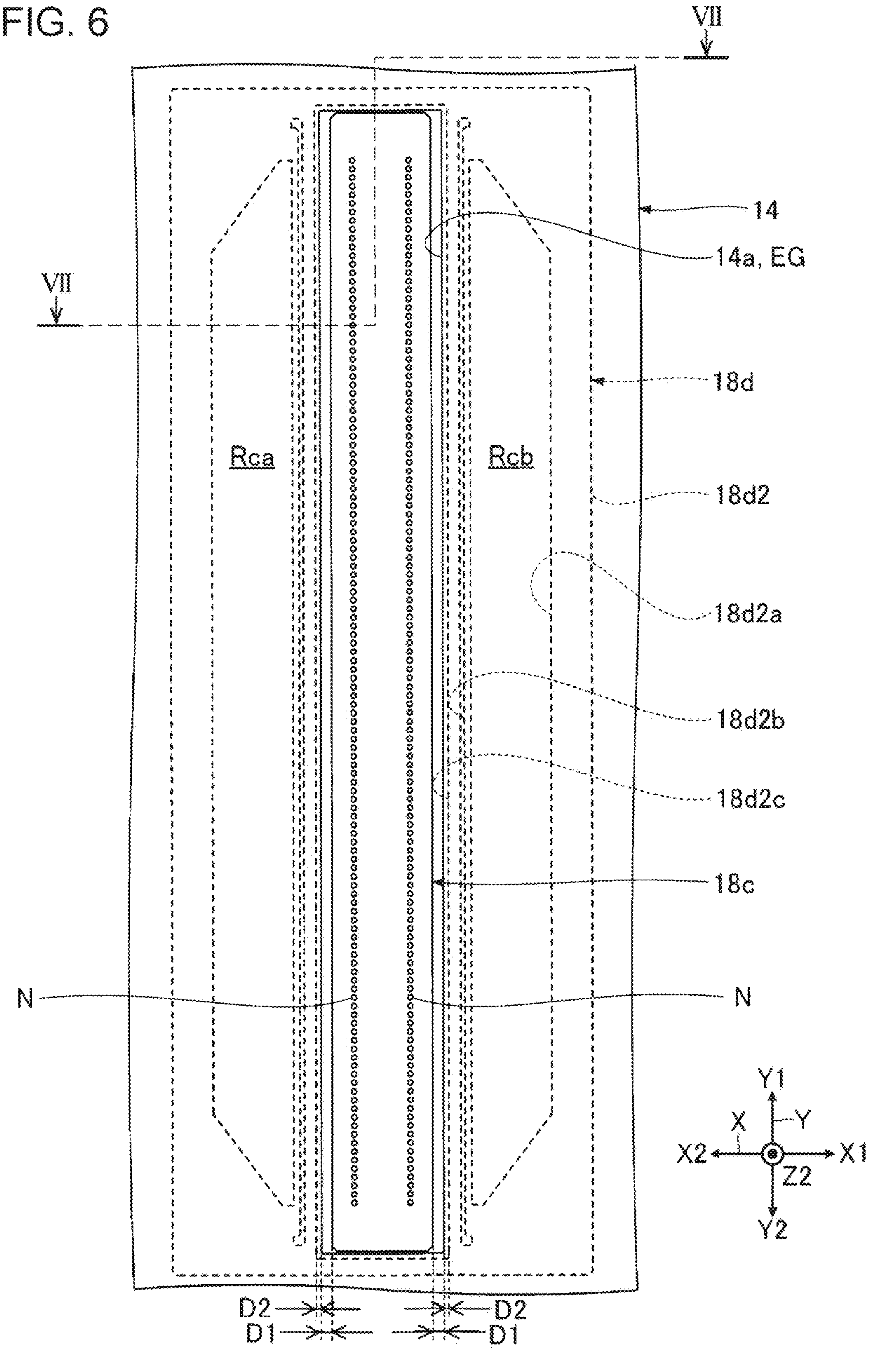
FIG. 6 is a plan view illustrating a positional relation between a nozzle plate, an opening portion of a fixing plate, and a compliance space of a compliance substrate.

FIG. 6 is a plan view illustrating a positional relation between the nozzle plate 18*c*, the opening portion 14*a* of the fixing plate 14, and the compliance spaces Rca and Rcb of the compliance substrate 18*d*. In FIG. 6, a part of the liquid ejecting head 1 when viewed in the Z1 direction is illustrated. Note that in FIG. 6, the shape of the frame body 18*d*2 of the compliance substrate 18*d* is indicated by a broken line.

As illustrated in FIG. 6, the fixing plate 14 is laminated on the compliance substrate 18*d* so as to cover the compliance substrate 18*d* when viewed in the Z1 direction. That is, the fixing plate 14 is laminated on a surface of the compliance substrate 18*d* facing in the Z2 direction over a range including the compliance substrate 18*d* when viewed in the Z1 direction.

Here, when viewed in the Z1 direction, the nozzle plate 18*c* is located inside the opening portion 14*a* of the fixing plate 14. That is, when viewed in the Z1 direction, the nozzle plate 18*c* is disposed inside a peripheral edge EG of the opening portion 14*a*. On the other hand, when viewed in the Z1 direction, the compliance substrate 18*d* is disposed outside the peripheral edge EG of the opening portion 14*a*, and is laminated on the communication plate 18*a* at a position different from the nozzle plate 18*c*.

As understandable from the above description, when viewed in the Z1 direction, the peripheral edge EG of the opening portion 14*a* is disposed between the compliance substrate 18*d* and the nozzle plate 18*c*.

In the example of FIG. 6, the peripheral edge EG of the opening portion 14*a* has a shape along an outer shape of the nozzle plate 18*c* when viewed in the Z1 direction. Specifically, the nozzle plate 18*c* has a rectangular shape whose longitudinal direction is a direction along the Y-axis when viewed in the Z1 direction, and the peripheral edge EG of the opening portion 14*a* has a rectangular shape along the outer shape of the nozzle plate 18*c* when viewed in the Z1 direction. In addition, the frame body 18*d*2 of the compliance substrate 18*d* has an opening 18*d*2*c* that encloses the opening portion 14*a* when viewed in the Z1 direction, and the opening 18*d*2*c* has a rectangular shape along the peripheral edge EG of the opening portion 14*a* when viewed in the Z1 direction.

FIG. 7 is a sectional view of the liquid ejecting head 1 according to the first embodiment. FIG. 7 is a sectional view taken along line VII-VII in FIG. 6. Note that in FIG. 7, a configuration related to the nozzle row La of the liquid ejecting head 1 is representatively illustrated, but a configuration related to the nozzle row Lb of the liquid ejecting head 1 is similar to the configuration related to the nozzle row La of the liquid ejecting head 1.

As illustrated in FIG. 7, the liquid ejecting head 1 includes the mold 18*f* that closes a gap GP1 between the nozzle plate 18*c* and the fixing plate 14. The mold 18*f* has a function of alleviating a level difference between the fixing plate 14 and the nozzle plate 18*c* and protecting a bonded portion or the like between the compliance substrate 18*d* and the communication plate 18*a*. The mold 18*f* is composed of, for example, a resin composition containing a thermosetting resin such as an epoxy resin. The resin composition may contain an inorganic filler such as silica, alumina, or the like.

Here, the size of the gap GP1 is not particularly limited, but is, for example, approximately 0.08 mm. Therefore, the mold 18*f* spreads over the entire area of the gap GP1 by a capillary phenomenon in a liquid state before being cured.

The mold 18*f* includes a surface 18*f*1 exposed to the outside. In the liquid ejecting head 1, when a liquid such as ink is ejected from the nozzle N, foggy mist may be generated. Since the surface 18*f*1 of the mold 18*f* is exposed inside the opening portion 14*a* of the fixing plate 14, the generated mist is attached to the surface 18*f*1 of the mold 18*f*. When a component contained in the liquid attached to the surface 18*f*1 penetrates the mold 18*f*, deformation due to swelling of the mold 18*f* may be caused.

As in the case of the liquid ejecting head described in JP-A-2017-121760, in an aspect in which the peripheral edge of the opening portion of the fixing plate overlaps with the compliance substrate when viewed in the Z1 direction, since the distance between the peripheral edge of the compliance substrate and the surface of the mold is short, deformation of the mold is likely to cause a crack in the mold starting at the peripheral edge of the compliance substrate. In addition, since the crack easily reaches a bonded portion related to the compliance substrate, the bonded portion related to the compliance substrate is likely to be damaged by a liquid entering from the crack.

Therefore, in the liquid ejecting head 1, as described above, the peripheral edge EG of the opening portion 14*a* is disposed between the compliance substrate 18*d* and the nozzle plate 18*c* when viewed in the Z1 direction. As a result, the compliance substrate 18*d* is disposed outside the peripheral edge EG of the opening portion 14*a* of the fixing plate 14. Therefore, compared to an aspect in which, as shown in JP-A-2017-121760, the peripheral edge EG of the opening portion 14*a* of the fixing plate 14 overlaps with the compliance substrate 18*d* when viewed in the Z1 direction, the distance from the surface 18*f*1 of the mold 18*f* to the bonded portion related to the compliance substrate 18*d* can be made long. As a result, it is possible to make it difficult to generate a crack of the mold 18*f*. As a result, entry of a liquid from a cracked portion of the mold 18*f* can be prevented.

Here, the bonded portion related to the compliance substrate 18*d* is a bonded position of the compliance substrate 18*d* with respect to the communication plate 18*a*, a bonded position of the compliance substrate 18*d* with respect to the fixing plate 14, and a bonding layer that bonds laminated components constituting the compliance substrate 18*d*. In addition, the distance from the surface 18*f*1 of the mold 18*f* to the bonded portion related to the compliance substrate 18*d* is an effective distance via the inside of the mold 18*f*.

As described above, the spaces R1*a* and R1*b*, the plurality of supply channels RRa and RRb, and the plurality of communication channels NRa and NRb are formed in the communication plate 18*a* as channels in communication with the nozzles N. Therefore, through preventing of a crack of the mold 18*f* as described above, the channels of the communication plate 18*a* can be prevented from being in communication with the outside through a crack of the mold 18*f*. As a result, liquid leakage from a channel of the communication plate 18*a* can be prevented, and mixing of bubbles in a channel of the communication plate 18*a* can be prevented.

In addition, as described above, the compliance substrate 18*d* is a substrate for reducing pressure fluctuations in a channel of the communication plate 18*a*. Therefore, through preventing of a crack of the mold 18*f* as described above, entry of a liquid into the compliance spaces Rca and Rcb can be prevented. As a result, an action of reducing pressure fluctuations in the channel of the communication plate 18*a* by the compliance substrate 18*d* can be exerted for a long period of time.

In the example of FIG. 7, in the X1 direction or the X2 direction, which is a direction orthogonal to the Z2 direction, an interval D1 between the compliance substrate 18*d* and the peripheral edge EG of the opening portion 14*a* is longer than an interval D2 between the nozzle plate 18*c* and the peripheral edge EG of the opening portion 14*a*. That is, when viewed on the same sectional surface orthogonal to the Z2 direction, in a case in which the interval D1 is an interval between the opening 18*d*2*c* of the compliance substrate 18*d* and the peripheral edge EG of the opening portion 14*a* of the fixing plate 14, and the interval D2 is an interval between the nozzle plate 18*c* and the peripheral edge EG of the opening portion 14*a* of the fixing plate 14, the interval D1 and the interval D2 satisfy a relationship of $D1 \geq D2$. Since this relationship is satisfied, compared to an aspect in which $D1 < D2$ is satisfied, the distance from the surface 18*f*1 of the mold 18*f* to the bonded portion related to the compliance substrate 18*d* can be made long. As a result, the effect of making it difficult to generate a crack of the mold 18*f* becomes remarkable.

Here, the X1 direction or the X2 direction is one direction orthogonal to a direction in which a side surface of the nozzle plate 18*c* or the peripheral edge EG of the opening portion 14*a* of the fixing plate 14 extends, and in the example of FIGS. 6 and 7, the X1 direction or the X2 direction is an arranging direction of the compliance spaces Rca and Rcb and the nozzle plate 18*c* when viewed in the Z1 direction. In addition, in terms of further improving the effect of making it difficult to generate a crack of the mold 18*f*, the interval D1 and the interval D2 more preferably satisfy a relationship of $D1 \geq 1.5 \times D2$, and further more preferably satisfy a relationship of $D1 \geq 2.0 \times D2$.

Note that the interval D1 may be equal to or less than interval D2. Even in this case, compared to an aspect in which, as shown in JP-A-2017-121760, the peripheral edge EG of the opening portion 14*a* of the fixing plate 14 overlaps with the compliance substrate 18*d* when viewed in the Z1 direction, it is possible to make it difficult to generate a crack of the mold 18*f*.

As illustrated in FIG. 7, in the present embodiment, the fixing plate 14 includes the projecting portion 14*b*. The projecting portion 14*b* projects, between the compliance substrate 18*d* and the nozzle plate 18*c*, in the Z1 direction from a surface on which the compliance substrate 18*d* is laminated. As described above, on a surface of the fixing plate 14 facing in the Z1 direction, the projecting portion 14*b* projecting in the Z1 direction is provided between the compliance substrate 18*d* and the nozzle plate 18*c*. Therefore, compared to an aspect in which the surface of the fixing plate 14 facing in the Z1 direction is flat over the entire area, the distance from the surface 18*f*1 of the mold 18*f* to the bonded portion related to the compliance substrate 18*d* can be made further longer. As a result, the effect of making it difficult to generate a crack of the mold 18*f* can be enhanced.

The projecting portion 14*b* projects further in the Z1 direction than is the first surface F1 of the communication plate 18*a*. Therefore, compared to an aspect in which, as shown in a second modification described later, a projecting portion 14*d* does not project further in the Z1 direction than is the first surface F1, the distance from the surface 18*f*1 of the mold 18*f* to the bonded portion related to the compliance substrate 18*d* can be made further longer. As a result, the effect of making it difficult to generate a crack of the mold 18*f* can be enhanced.

In addition, a leading end of the projecting portion 14*b* projects inside the recessed portion 18*a*1. That is, the leading end of the projecting portion 14*b* is located inside the recessed portion 18*a*1. As a result, a gap GP2 that meanders between the projecting portion 14*b* of the fixing plate 14 and the recessed portion 18*a*1 of the communication plate 18*a* is provided. Therefore, the distance from the surface 18*f*1 of the mold 18*f* to the bonded portion related to the compliance substrate 18*d* can be made further longer.

Here, the size of the gap GP2 is not particularly limited, but is, for example, approximately 0.05 mm. Therefore, the mold 18*f* spreads over the entire area of the gap GP2 by a capillary phenomenon in a liquid state before being cured.

The projecting portion 14*b* is disposed at the peripheral edge EG of the opening portion 14*a*. Therefore, the fixing plate 14 can be easily manufactured through punching of a metal plate, or the like. Specifically, the fixing plate 14 can be easily manufactured through folding of a portion near the peripheral edge EG of the opening portion 14*a* of the fixing plate 14 to form the projecting portion 14*b*, and punching to form the opening portion 14*a* of the fixing plate 14.

The projecting portion 14*b* is provided over substantially the entire periphery along the peripheral edge EG of the opening portion 14*a*. As a result, an attack by a liquid to each adhesive related to the compliance substrate 18*d* as described above can be preferably prevented. However, as described based on FIG. 8 described later, the projecting portion 14*b* does not have to be provided at the four corners of the opening portion 14*a*.

Note that the projecting portion 14*b* may be provided only along sides, of the peripheral edge EG of the opening portion 14*a*, along the compliance spaces Rca and Rcb. Even in this case, as described above, the function of the compliance substrate 18*d* can be prevented from being deteriorated.

Figure 8:
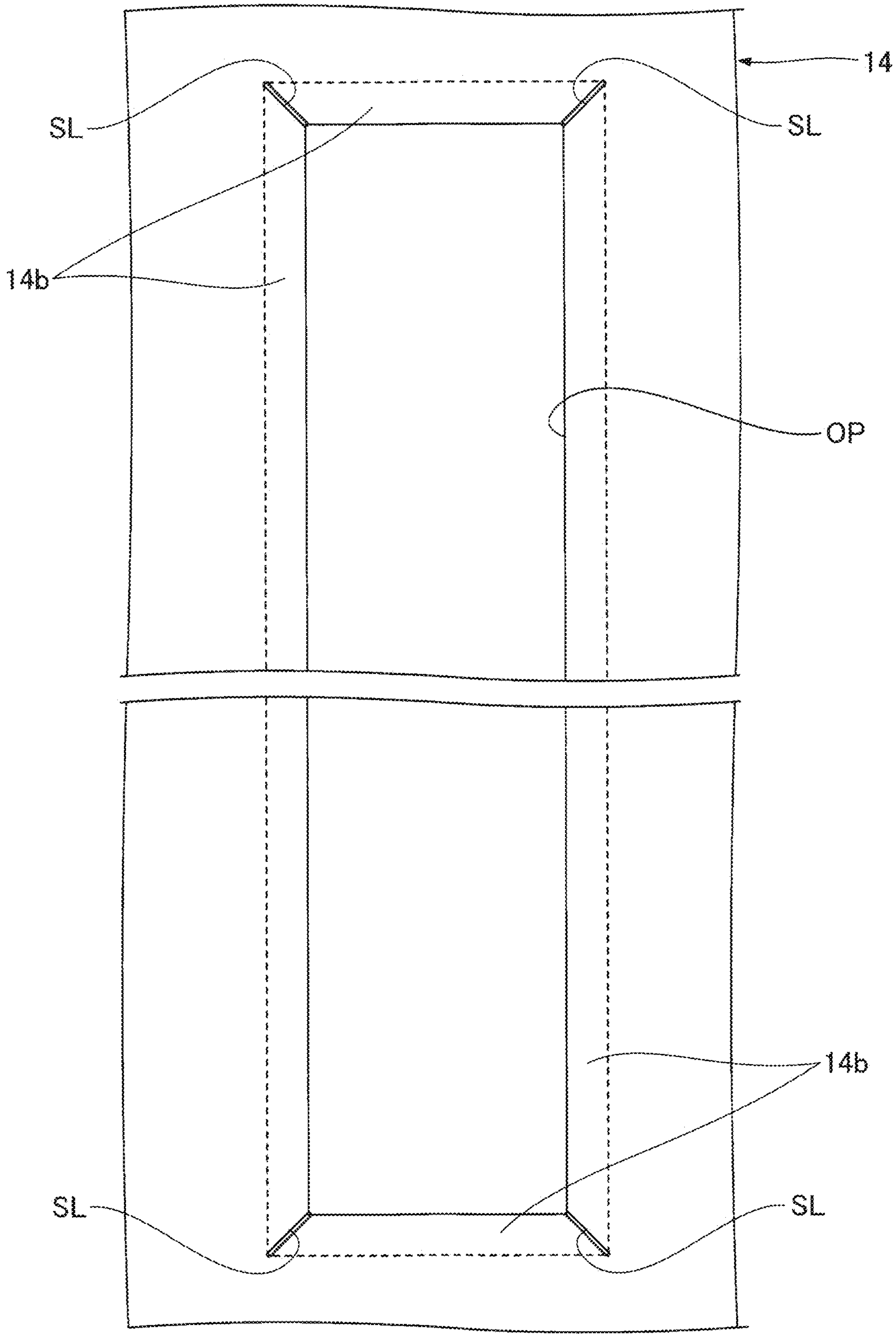
FIG. 8 is a view for explaining an example of a forming method of the opening portion of the fixing plate.

FIG. 8 is a diagram for explaining an example of a forming method of the opening portion 14*a* of the fixing plate 14. FIG. 8 illustrates a state in which the fixing plate 14 is developed on a plane.

As illustrated in FIG. 8, when the fixing plate 14 is developed on a plane, the fixing plate 14 has an opening OP and four cut portions SL. The opening OP is a space surrounded by leading ends of the four projecting portions 14*b*. Each cut portion SL is a gap between the adjacent two projecting portions 14*b*. Here, in FIG. 8, a portion corresponding to the peripheral edge EG of the opening portion 14*a* described above is indicated by a broken line. Through folding of the applicable portion, the projecting portion 14*b* projecting in the Z1 direction is formed as illustrated in FIG. 7, and the opening portion 14*a* is also formed.

As described above, when the projecting portion 14*b* is formed through folding of a portion near the peripheral edge EG of the opening portion 14*a* having a rectangular shape in plan view, in some cases, the projecting portion 14*b* cannot be provided at the four corners of the opening portion 14*a*. However, even in such a case, since the distance between the nozzle plate 18*c* and the fixing plate 14 is long at the four corners of the opening portion 14*a* compared to other portions, the risk of generating a crack of the mold 18*f* is low.

Note that the forming method of the projecting portion 14*b* is not limited to punching of a metal plate, and may be, for example, a method of forming the projecting portion 14*b* in the fixing plate 14 through welding or bonding such as diffusion bonding, or a method of forming the projecting portion 14*b* in the fixing plate 14 through performing of etching on a wide range of the fixing plate 14 other than the projecting portion 14*b*. In the methods described above, even when the projecting portion 14*b* is located away from the peripheral edge EG of the opening portion 14*a* of the fixing plate 14, the projecting portion 14*b* can be provided in the fixing plate 14. However, in terms of cost reduction, punching of a metal plate is preferable to the above-described methods.

As described above, according to the first embodiment, a crack of the mold 18*f* can be prevented, and a failure caused by entry of a liquid into a crack of the mold 18*f* can be prevented.

2. SECOND EMBODIMENT

Hereinafter, a second embodiment of the present disclosure will be described. In the embodiment exemplified blow, for elements that have actions or functions similar to those in the first embodiment, the reference numerals used in the first embodiment will be used, and detailed description of the respective elements will be appropriately omitted.

Figure 9:
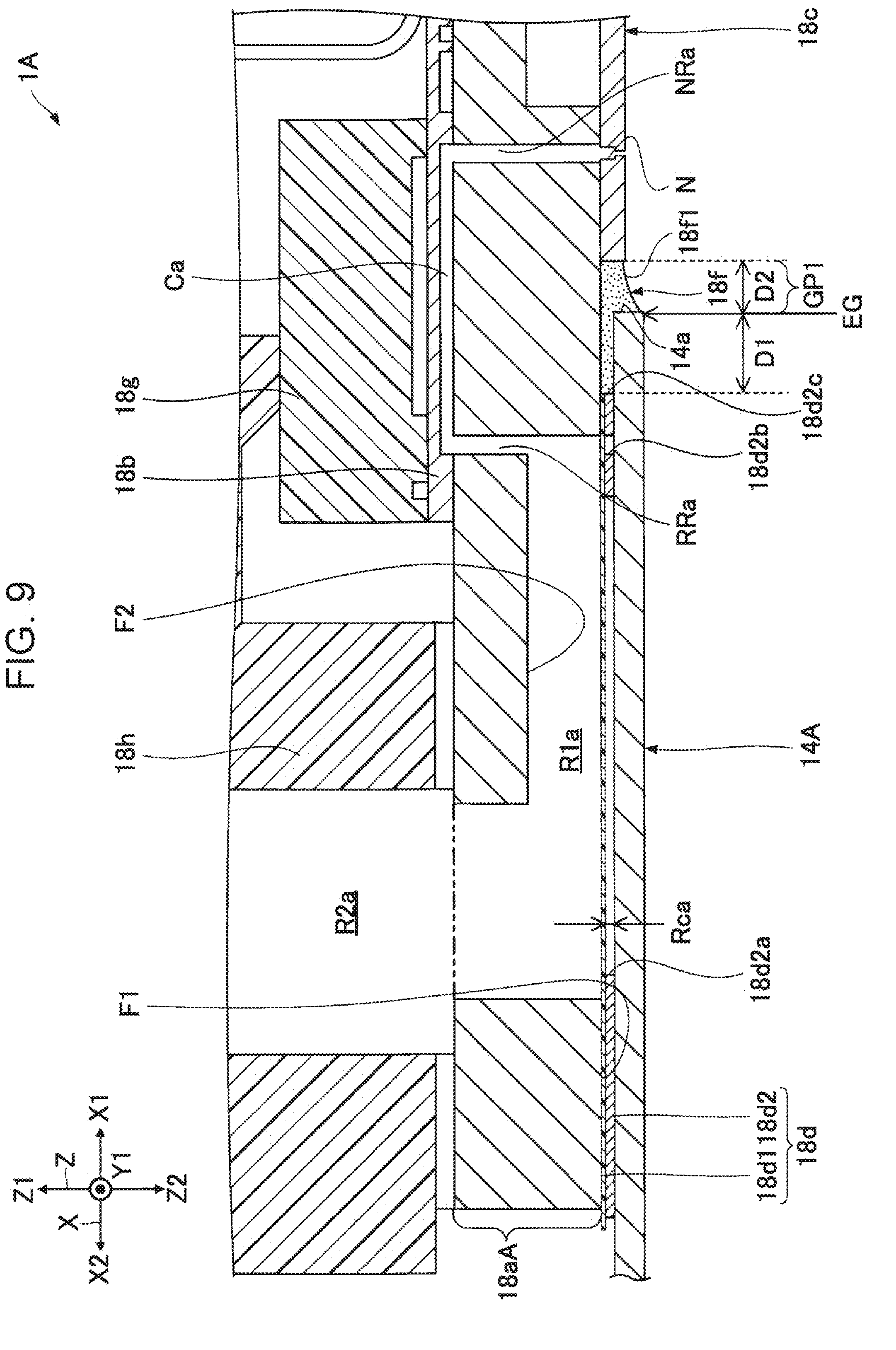
FIG. 9 is a sectional view of a liquid ejecting head according to a second embodiment.

FIG. 9 is a sectional view of a liquid ejecting head 1A according to the second embodiment. The liquid ejecting head 1A is configured similarly to the liquid ejecting head 1 of the first embodiment except that the liquid ejecting head 1A includes a communication plate 18*a*A and a fixing plate 14A instead of the communication plate 18*a* and the fixing plate 14 of the first embodiment. The communication plate 18*a*A is configured similarly to the communication plate 18*a* of the first embodiment except that the recessed portion 18*a*1 of the first embodiment is omitted. The fixing plate 14A is configured similarly to the fixing plate 14 of the first embodiment except that the projecting portion 14*b* of the first embodiment is omitted.

Even in the liquid ejecting head 1A described above, similarly to the first embodiment, the peripheral edge EG of the opening portion 14*a* is disposed between the compliance substrate 18*d* and the nozzle plate 18*c* when viewed in the Z1 direction. Therefore, it is possible to make it difficult to generate a crack of the mold 18*f*. In addition, since the interval D1 and the interval D2 satisfy the relationship of D1 D2, the effect of making it difficult to generate a crack of the mold 18*f* becomes remarkable. Moreover, in the present embodiment as well, the interval D1 and the interval D2 more preferably satisfy the relationship of D1≥1.5×D2, and further more preferably satisfy the relationship of D1≥2.0×D2.

3. MODIFICATION

The embodiments described above can be modified in various ways. Specific modification aspects that can be applied to the embodiments described above are exemplified below. Two or more aspects optionally selected from the examples below can be appropriately combined within a range in which the aspects are compatible with each other.

3-1. First Modification

Figure 10:
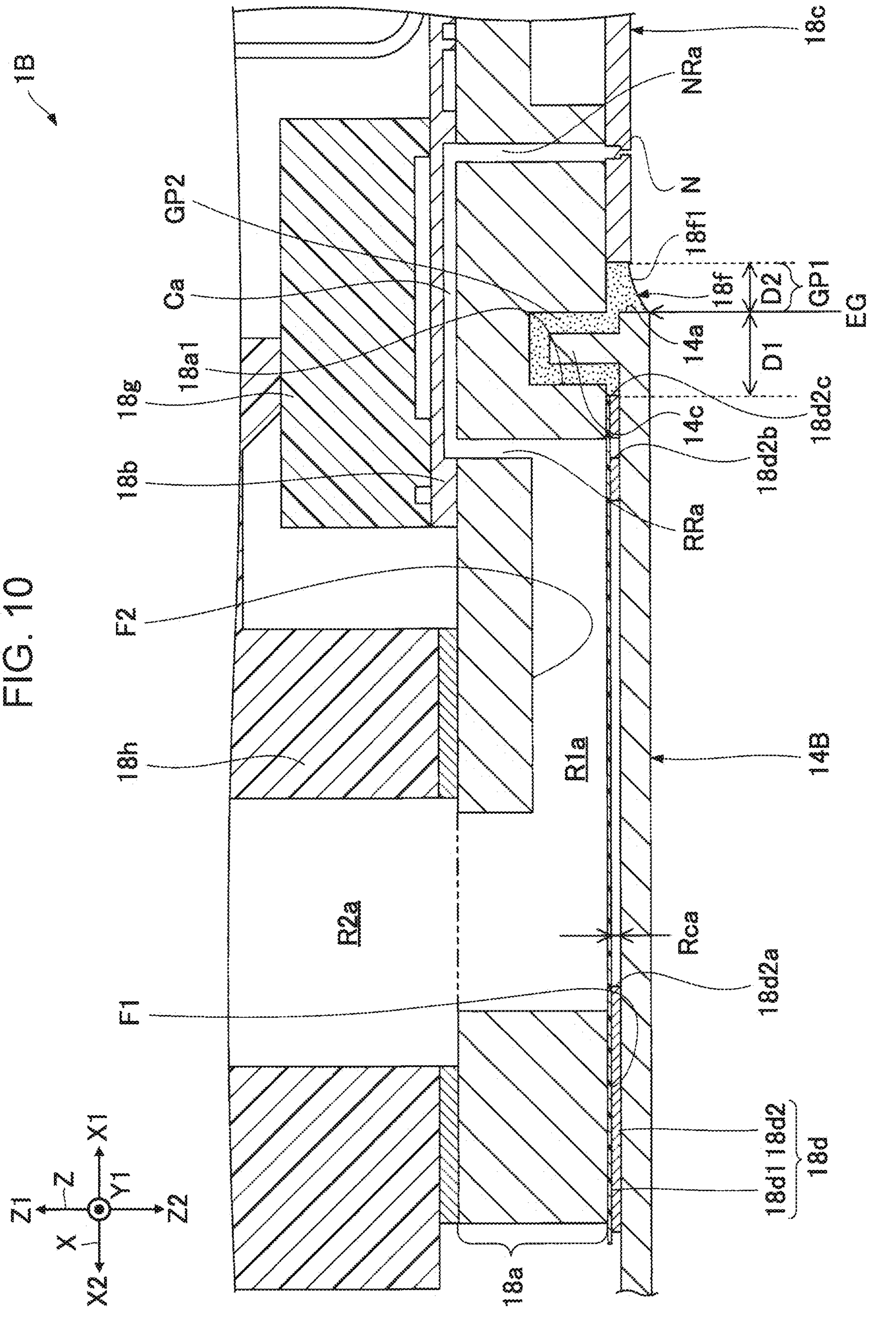
FIG. 10 is a sectional view of a liquid ejecting head according to a first modification.

FIG. 10 is a sectional view of a liquid ejecting head 1B according to a first modification. The liquid ejecting head 1B is configured similarly to the liquid ejecting head 1 of the first embodiment except that the liquid ejecting head 1B includes a fixing plate 14B instead of the fixing plate 14 of the first embodiment. The fixing plate 14B is configured similarly to the fixing plate 14 of the first embodiment except that the fixing plate 14B includes a projecting portion 14*c* instead of the projecting portion 14*b* of the first embodiment.

The projecting portion 14*c* is configured similarly to the projecting portion 14*b* of the first embodiment except that the projecting portion 14*c* is provided apart from the peripheral edge EG of the opening portion 14*a* of the fixing plate 14B. However, it is difficult to manufacture the fixing plate 14B including the projecting portion 14*c* described above through folding of a metal plate as described in the first embodiment. Therefore, the method of forming the projecting portion 14*c* may be, for example, a method of forming the projecting portion 14*c* in the fixing plate 14B through welding or bonding such as diffusion bonding, or a method of forming the projecting portion 14*c* in the fixing plate 14B through performing of etching on a wide range in the fixing plate 14B other than the projecting portion 14*c*.

In the above-described first modification as well, similarly to the first embodiment, it is possible to make it difficult to generate a crack of the mold 18*f*.

3-2. Second Modification

Figure 11:
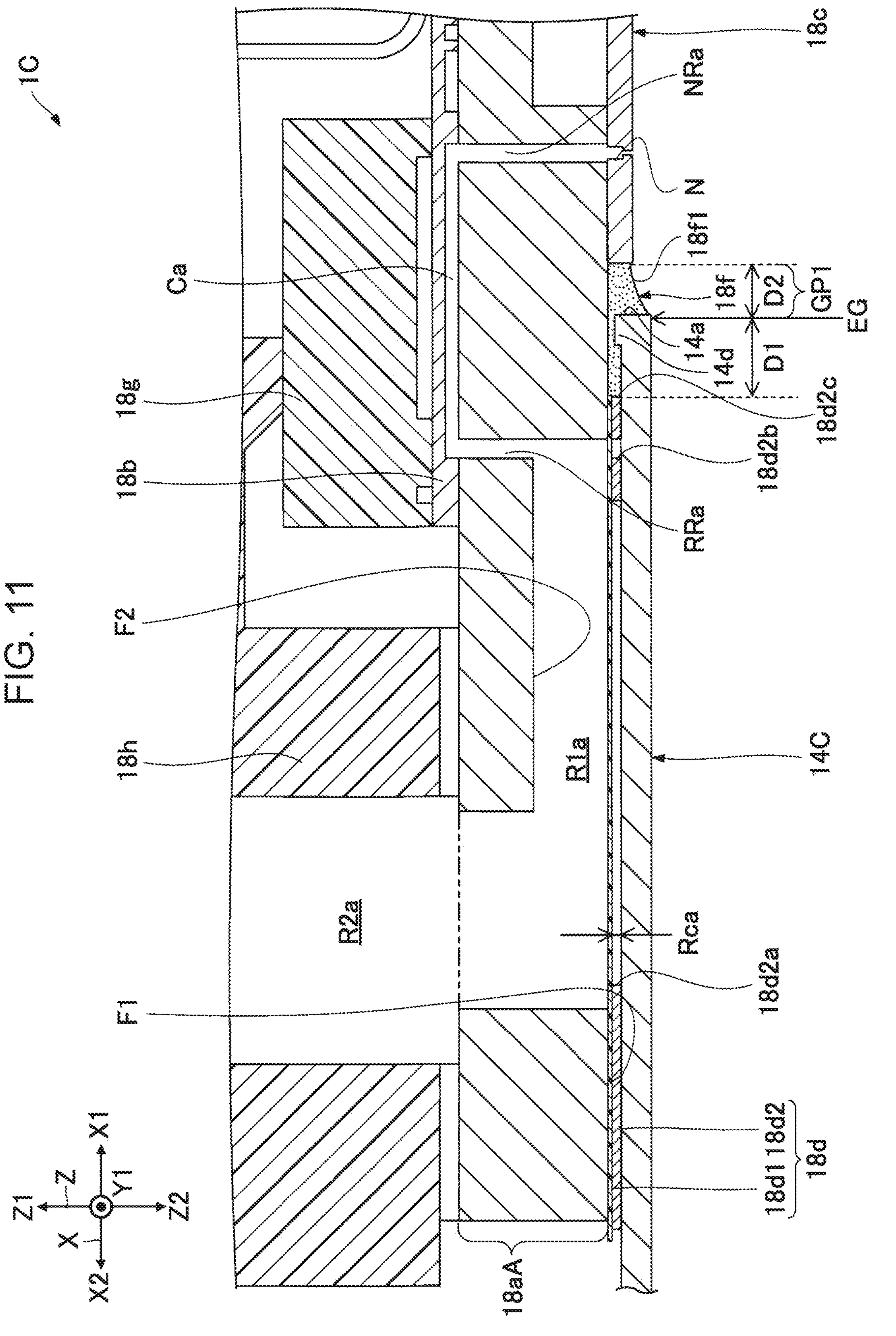
FIG. 11 is a sectional view of a liquid ejecting head according to a second modification.

FIG. 11 is a sectional view of a liquid ejecting head 1C according to a second modification. The liquid ejecting head 1C is configured similarly to the liquid ejecting head 1 of the first embodiment except that the liquid ejecting head 1C includes the communication plate 18*a*A and a fixing plate 14C instead of the communication plate 18*a* and the fixing plate 14 of the first embodiment. The communication plate 18*a*A is configured similarly to the communication plate 18*a*A of the second embodiment. The fixing plate 14C is configured similarly to the fixing plate 14 of the first embodiment except that the fixing plate 14C includes a projecting portion 14*d* instead of the projecting portion 14*b* of the first embodiment.

The projecting portion 14*d* is configured similarly to the projecting portion 14*b* of the first embodiment except that the projecting portion 14*d* is shorter than the projecting portion 14*b* of the first embodiment. Here, the projecting portion 14*d* does not project further in the Z1 direction than is the first surface F1 of the communication plate 18*a*A.

In the above-described second modification as well, since the peripheral edge EG of the opening portion 14*a* is disposed between the compliance substrate 18*d* and the nozzle plate 18*c* when viewed in the Z1 direction, although the second modification is inferior to the first embodiment, it is possible to make it difficult to generate a crack of the mold 18*f*. In addition, compared to an aspect in which the projecting portion 14*d* is not provided as shown in the second embodiment, the effect of making it difficult to generate a crack of the mold 18*f* becomes remarkable.

3-3. Third Modification

In the above-described embodiments, an aspect in which the "first substrate" is the communication plate 18*a*, and the "second substrate" is a compliance substrate is exemplified, but the present disclosure is not limited to the aspect. The "first substrate" is not limited to the communication plate 18*a*, and is sufficient as long as being a member on which the second substrate and the nozzle plate 18*c* are laminated. Note that the "second substrate" is not limited to the compliance substrate 18*d*, and for example, may be a 11*d* member that simply closes a channel of the communication plate 18*a*.

Figure 12:
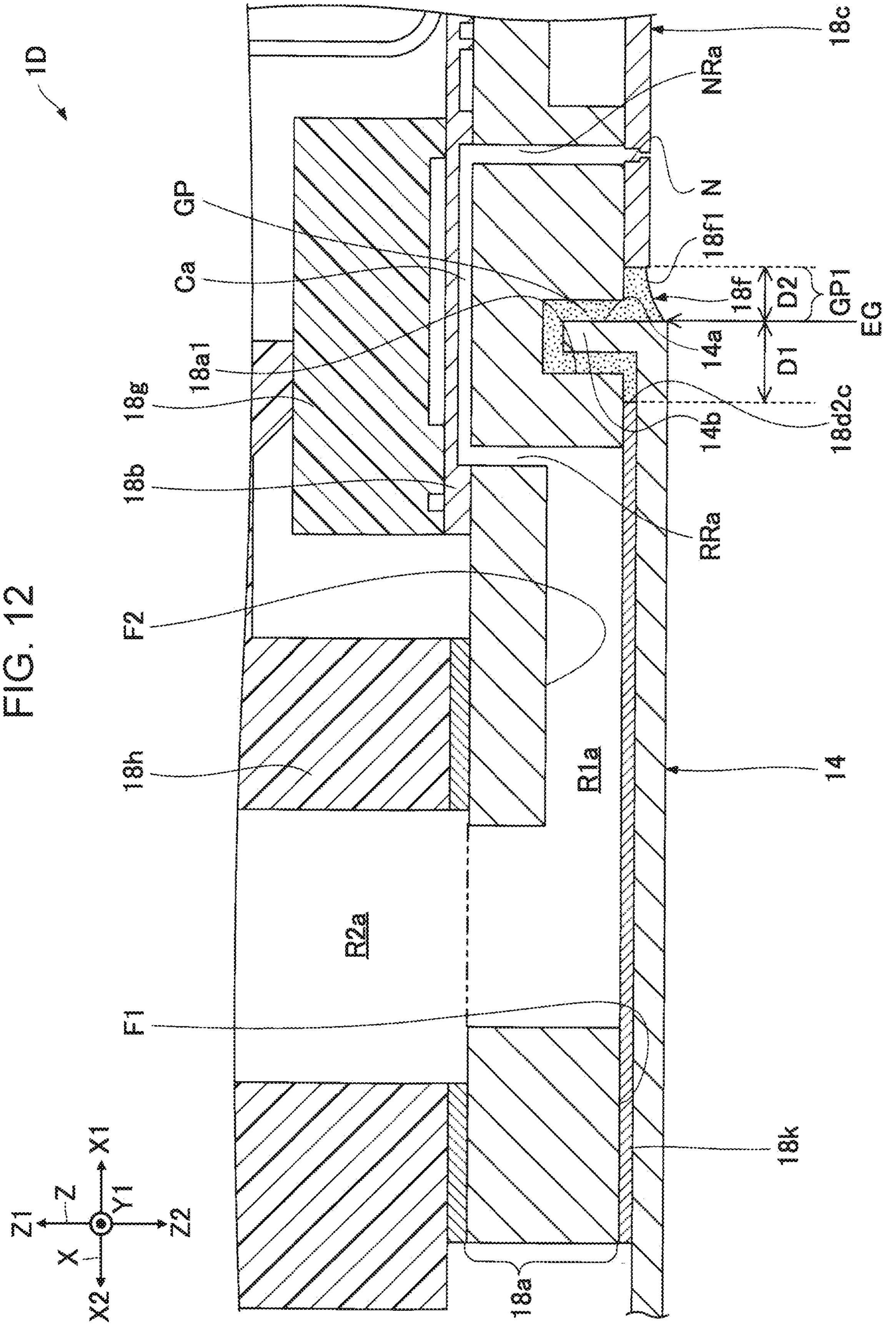
FIG. 12 is a sectional view of a liquid ejecting head according to a third modification.

FIG. 12 is a sectional view of a liquid ejecting head 1D according to a third modification. The liquid ejecting head 1D is configured similarly to the liquid ejecting head 1 of the first embodiment except that the liquid ejecting head 1D includes a 11*d* member 18*k* instead of the compliance substrate 18*d* of the first embodiment. The 11*d* member 18*k* is laminated on the communication plate 18*a* at a position different from the nozzle plate 18*c*. That is, the 11*d* member 18*k* and the nozzle plate 18*c* are laminated on a surface of the communication plate 18*a* facing in the Z2 direction so as not to overlap with each other. The 11*d* member 18*k* is a plate member that constitutes a part of wall surfaces of the liquid storage chambers Ra and Rb, and does not have a function of absorbing pressure fluctuations in the ink in the liquid storage chambers Ra and Rb. The 11*d* member 18*k* is, for example, a silicon substrate, a metal plate, or a resin plate.

In the above-described third modification as well, similarly to the first embodiment, it is possible to make it difficult to generate a crack of the mold 18*f*.

3-4. Fourth Modification

In the above-described embodiments, an aspect in which a liquid ejecting head includes four head chips is exemplified, but the present disclosure is not limited to the aspect, and the number of head chips included in the liquid ejecting head may be equal to or less than three, or equal to or more than five. In addition, when the liquid ejecting head includes a plurality of head chips, arrangement of the plurality of head chips is not limited to the above-described embodiments, and any arrangement is adopted. In addition, the shape of the liquid ejecting head is also not limited to the above-described embodiments, and any shape is adopted.

3-5. Fifth Modification

In the above-described embodiments, the liquid ejecting apparatus 100 of a serial type in which the transport body 41 mounted with the liquid ejecting head 1 is reciprocated in a width direction of the medium M is exemplified, but the liquid ejecting apparatus may be a line type in which the plurality of nozzles N is distributed over the entire width of the medium M.

3-6. Sixth Modification

The liquid ejecting apparatus exemplified in the above-described embodiments can be adopted to various types of devices such as a facsimile apparatus and a copy machine, in addition to a device dedicated for printing. The use of the liquid ejecting apparatus is not limited to printing. For example, a liquid ejecting apparatus that ejects a solution of a coloring material is used as a manufacturing apparatus that forms a color filter of a display device such as a liquid crystal display panel. In addition, a liquid ejecting apparatus that ejects a solution of a conductive material is used as a manufacturing apparatus that forms wiring or an electrode of a wiring substrate. In addition, a liquid ejecting apparatus that ejects a living organic solution is used as a manufacturing apparatus that manufactures, for example, a biochip.

4. SUPPLEMENTS

The summary of the present disclosure will be supplemented below.

Supplement 1

A liquid ejecting head of a first aspect, which is a preferred example of the present disclosure, includes a first substrate, a nozzle plate that is laminated on the first substrate and includes a plurality of nozzles that ejects a liquid in a first direction, a second substrate that is laminated on the first substrate at a position different from the nozzle plate, a fixing plate that is laminated on the second substrate to cover the second substrate when viewed in a second direction opposite to the first direction and includes an opening portion through which the nozzle plate is exposed to an outside, and a mold that closes a gap between the nozzle plate and the fixing plate, and the opening portion has a peripheral edge that is disposed between the second substrate and the nozzle plate when viewed in the second direction.

In the above-described first aspect, since the peripheral edge of the opening portion of the fixing plate is disposed between the second substrate and the nozzle plate when viewed in the second direction, the second substrate is disposed outside the peripheral edge of the opening portion of the fixing plate. Therefore, compared to an aspect in which the peripheral edge of the opening portion of the fixing plate overlaps with the second substrate when viewed in the second direction, the distance from the surface of the mold to a bonded portion related to the second substrate can be made long. Therefore, it is possible to make it difficult to generate a crack of the mold. As a result, entry of a liquid from a cracked portion of the mold can be prevented.

Supplement 2

In a second aspect, which is a preferred example of the first aspect, in a direction orthogonal to the first direction, an interval between the second substrate and the peripheral edge of the opening portion is longer than an interval between the nozzle plate and the peripheral edge of the opening portion. In the above-described second aspect, compared to an aspect in which the size relation of the above-described intervals is reversed, the distance from a surface of the mold to the bonded portion related to the second substrate can be made long. As a result, the effect of making it difficult to generate a crack of the mold becomes remarkable.

Supplement 3

In a third aspect, which is a preferred example of the first aspect or the second aspect, the fixing plate includes a projecting portion that projects, between the second substrate and the nozzle plate, in the second direction from a surface on which the second substrate is laminated. In the above-described third aspect, compared to an aspect in which the surface of the fixing plate on which the second substrate is laminated is flat, the distance from the surface of the mold to the bonded portion related to the second substrate can be made further longer. As a result, the effect of making it difficult to generate a crack of the mold can be enhanced.

Supplement 4

In a fourth aspect, which is a preferred example of the third aspect, the first substrate includes a first surface on which the nozzle plate is laminated, and the projecting portion projects further in the second direction than is the first surface of the first substrate. In the above-described fourth aspect, compared to an aspect in which the projecting portion does not project further in the second direction than is the first surface of the first substrate, the distance from the surface of the mold to the bonded portion related to the second substrate can be made further longer. As a result, the effect of making it difficult to generate a crack of the mold can be enhanced.

Supplement 5

In a fifth aspect, which is a preferred example of the fourth aspect, a recessed portion that is recessed in the second direction is formed in the first surface of the first substrate, and a leading end of the projecting portion projects inside the recessed portion. In the above-described fifth aspect, a gap that meanders between the projecting portion of the fixing plate and the recessed portion of the first substrate is provided. Therefore, the distance from the surface of the mold to the bonded portion related to the second substrate can be made further longer.

Supplement 6

In a sixth aspect, which is a preferred example of the fifth aspect, the first substrate includes a second surface that defines a part of a channel in communication with the nozzles and that faces in the first direction, and a bottom surface of the recessed portion and the second surface of the first substrate are disposed at substantially a same position in the first direction. In the above-described sixth aspect, the recessed portion can be formed in the same single process as half etching for forming a channel in the first substrate. Therefore, the first substrate can be easily manufactured, compared to an aspect in which the bottom surface of the recessed portion and the second surface of the first substrate are disposed at deviated positions in the first direction.

Supplement 7

In a seventh aspect, which is a preferred example of the third aspect, the projecting portion is disposed at the peripheral edge of the opening portion. In the above-described seventh aspect, the fixing plate can be easily manufactured through punching of a metal plate, or the like. Specifically, the fixing plate can be easily manufactured through folding of a portion near the peripheral edge of the opening portion of the fixing plate to form the projecting portion, and punching to form the opening portion of the fixing plate.

Supplement 8

In an eighth aspect, which is a preferred aspect of any one of the first to the seventh aspects, the first substrate is a communication plate in which a channel in communication with the nozzles is formed. In the above-described eighth aspect, the channel of the first substrate can be prevented from being in communication with the outside through a crack of the mold. As a result, liquid leakage from a channel of the first substrate can be prevented, and mixing of bubbles in a channel of the first substrate can be prevented.

Supplement 9

In a ninth aspect, which is a preferred example of any one of the first to the eighth aspects, the second substrate is a compliance substrate that reduces a pressure fluctuation in the channel. In the above-described ninth aspect, entry of a liquid into a compliance space can be prevented. As a result, an action of reducing a pressure fluctuation in the channel by the compliance substrate can be exerted for a long period of time.

Supplement 10

A liquid ejecting apparatus of a tenth aspect, which is a preferred example of the present disclosure, includes the liquid ejecting head according to any one of the first to the ninth aspects, and a liquid storage portion that stores a liquid to be supplied to the liquid ejecting head. In the above-described tenth aspect, entry of a liquid from a cracked portion of the mold of the liquid ejecting head is prevented, and the reliability of the liquid ejecting apparatus can be thus improved.

What is claimed is:

1. A liquid ejecting head comprising:

a first substrate;

a nozzle plate that is laminated on the first substrate and includes nozzles configured to eject a liquid in a first direction;

a second substrate that is laminated on the first substrate at a position different from the nozzle plate;

a fixing plate that is laminated on the second substrate to cover the second substrate when viewed in a second direction opposite to the first direction and includes an opening portion through which the nozzle plate is exposed to an outside; and a mold closing a gap between the nozzle plate and the fixing plate, wherein the opening portion has a peripheral edge that is disposed between the second substrate and the nozzle plate when viewed in the second direction, and in a direction orthogonal to the first direction, an interval between the second substrate and the peripheral edge of the opening portion is longer than an interval between the nozzle plate and the peripheral edge of the opening portion.

2. The liquid ejecting head according to claim 1, wherein the fixing plate includes a projecting portion that projects, between the second substrate and the nozzle plate, in the second direction from a surface on which the second substrate is laminated.

3. The liquid ejecting head according to claim 2, wherein the first substrate includes a first surface on which the nozzle plate is laminated, and the projecting portion projects further in the second direction than is the first surface of the first substrate.

4. The liquid ejecting head according to claim 3, wherein a recessed portion that is recessed in the second direction is formed in the first surface of the first substrate, and a leading end of the projecting portion projects inside the recessed portion.

5. The liquid ejecting head according to claim 4, wherein the first substrate includes a second surface that defines a part of a channel in communication with the nozzles and that faces in the first direction, and a bottom surface of the recessed portion and the second surface of the first substrate are disposed at substantially a same position in the first direction.

6. The liquid ejecting head according to claim 2, wherein the projecting portion is disposed at the peripheral edge of the opening portion.

7. The liquid ejecting head according to claim 1, wherein the first substrate is a communication plate in which a channel in communication with the nozzles is formed.

8. The liquid ejecting head according to claim 7, wherein the second substrate is a compliance substrate that reduces a pressure fluctuation in the channel.

9. A liquid ejecting apparatus comprising:

the liquid ejecting head according to claim 1; and a liquid storage portion that stores a liquid to be supplied to the liquid ejecting head.

10. A liquid ejecting head comprising:

a first substrate;

a nozzle plate that is laminated on the first substrate and includes nozzles configured to eject a liquid in a first direction;

a second substrate that is laminated on the first substrate at a position different from the nozzle plate;

a fixing plate that is laminated on the second substrate to cover the second substrate when viewed in a second direction opposite to the first direction and includes an opening portion through which the nozzle plate is exposed to an outside; and a mold closing a gap between the nozzle plate and the fixing plate, wherein the opening portion has a peripheral edge that is disposed between the second substrate and the nozzle plate when viewed in the second direction, and the fixing plate includes a projecting portion that projects, between the second substrate and the nozzle plate, in the second direction from a surface on which the second substrate is laminated.

11. The liquid ejecting head according to claim 10, wherein the first substrate includes a first surface on which the nozzle plate is laminated, and the projecting portion projects further in the second direction than is the first surface of the first substrate.

12. The liquid ejecting head according to claim 11, wherein a recessed portion that is recessed in the second direction is formed in the first surface of the first substrate, and a leading end of the projecting portion projects inside the recessed portion.

13. The liquid ejecting head according to claim 12, wherein the first substrate includes a second surface that defines a part of a channel in communication with the nozzles and that faces in the first direction, and a bottom surface of the recessed portion and the second surface of the first substrate are disposed at substantially a same position in the first direction.

14. The liquid ejecting head according to claim 10, wherein the projecting portion is disposed at the peripheral edge of the opening portion.

15. The liquid ejecting head according to claim 10, wherein the first substrate is a communication plate in which a channel in communication with the nozzles is formed.

16. The liquid ejecting head according to claim 15, wherein the second substrate is a compliance substrate that reduces a pressure fluctuation in the channel.

17. A liquid ejecting apparatus comprising:

the liquid ejecting head according to claim 10; and a liquid storage portion that stores a liquid to be supplied to the liquid ejecting head.

* * * * *